United States Patent [19]

Nichols et al.

[11] Patent Number: 5,347,466
[45] Date of Patent: Sep. 13, 1994

[54] METHOD AND APPARATUS FOR POWER PLANT SIMULATION AND OPTIMIZATION

[75] Inventors: Randall K. Nichols, Corpus Christi, Tex.; Charles M. Thatcher, Fayetteville, Ark.

[73] Assignee: The Board of Trustees of the University of Arkansas, Little Rock, Ark.

[21] Appl. No.: 731,204

[22] Filed: Jul. 15, 1991

[51] Int. Cl.$^5$ .................. G06F 15/20; F01K 13/02
[52] U.S. Cl. .................. 364/492; 364/578; 60/660; 60/667
[58] Field of Search ............... 364/492, 494, 483, 495, 364/150, 156, 158, 184, 186, 188, 578; 60/660, 667

[56] References Cited

U.S. PATENT DOCUMENTS

| | | | |
|---|---|---|---|
| 4,069,675 | 1/1978 | Adler et al. | 364/492 |
| 4,297,848 | 11/1981 | Silvestri, Jr. | 364/494 |
| 4,977,529 | 12/1990 | Gregg et al. | 364/578 |
| 5,021,976 | 6/1991 | Wexelblat et al. | 364/188 |
| 5,081,591 | 1/1992 | Hanway et al. | 364/485 |
| 5,101,337 | 3/1992 | Ebizaka | 364/184 |

Primary Examiner—Vincent N. Trans
Attorney, Agent, or Firm—Hermann Ivester

[57] ABSTRACT

A system for simulating and optimizing a powerhouse, designed to furnish electrical power to a process plant, incorporates a plurality of units for simulating operation of the individual components of the powerhouse, and for calculating the cost of operation of the system as a whole, including the cost of fuel for the powerhouse components and the cost of purchased power needed to satisfy the power demand of the process plant beyond the capacity of the powerhouse. An adaptive search routine varies all of the operative parameters of the powerhouse, on a random basis, and repeats the simulation, in order to identify a combination of parameters which represents a lower cost solution. The range of random variation is reduced, as lower cost solutions are not found within a given number of repetitions, in order to identify a precise convergence on the optimum solution. The procedure may be restarted, and repeated many times, with the range of variation each time initially at maximum, in order to insure the identification of the global optimum.

8 Claims, 24 Drawing Sheets

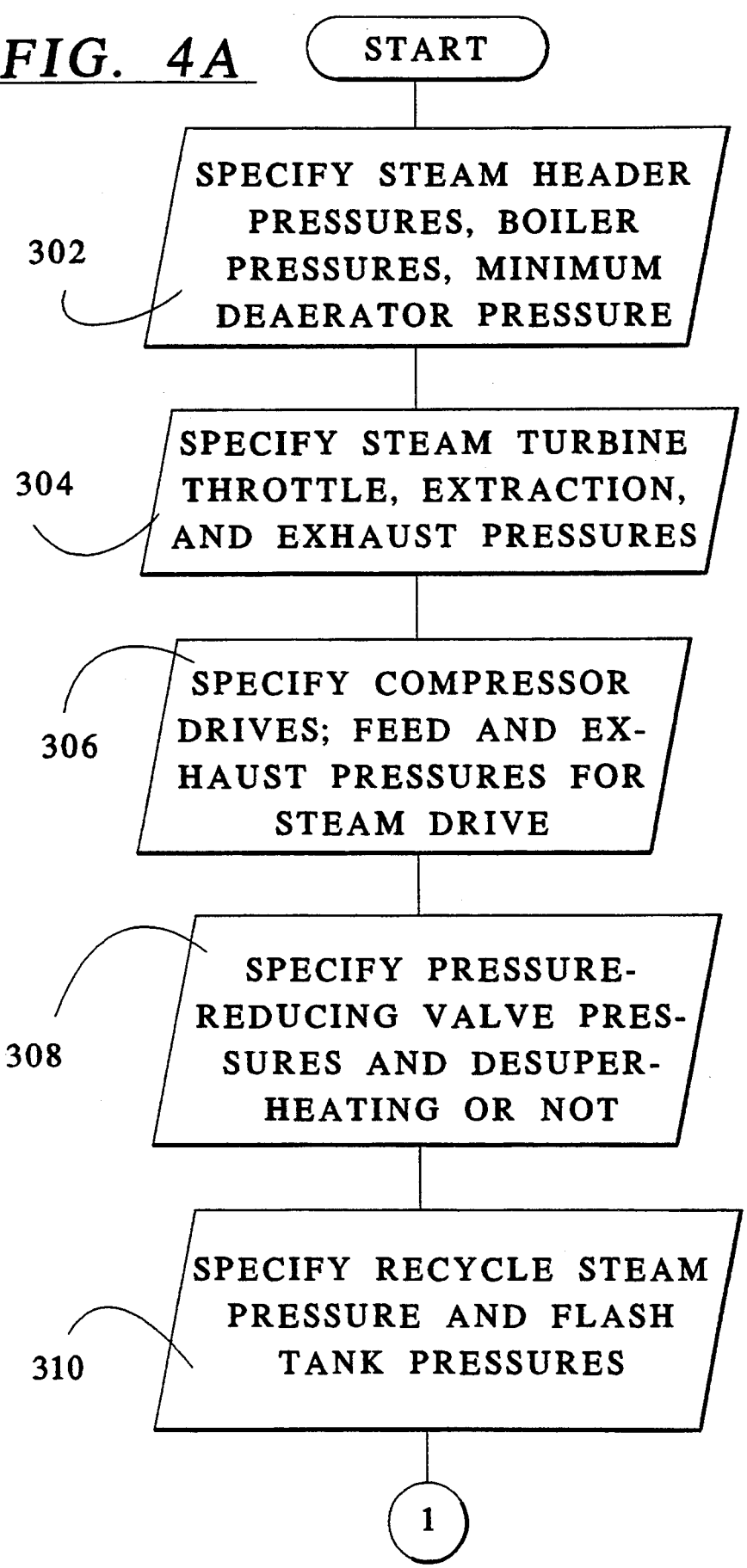

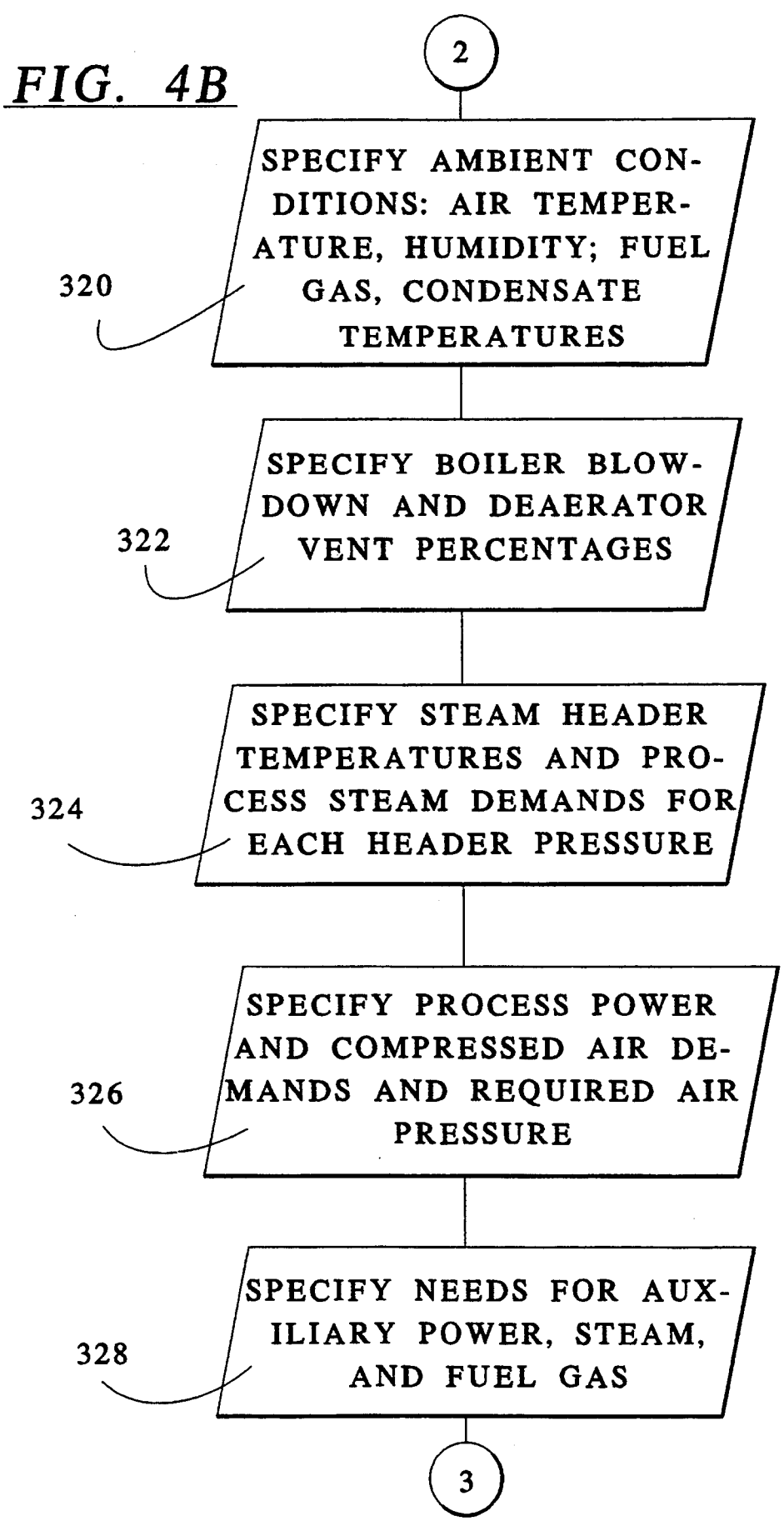

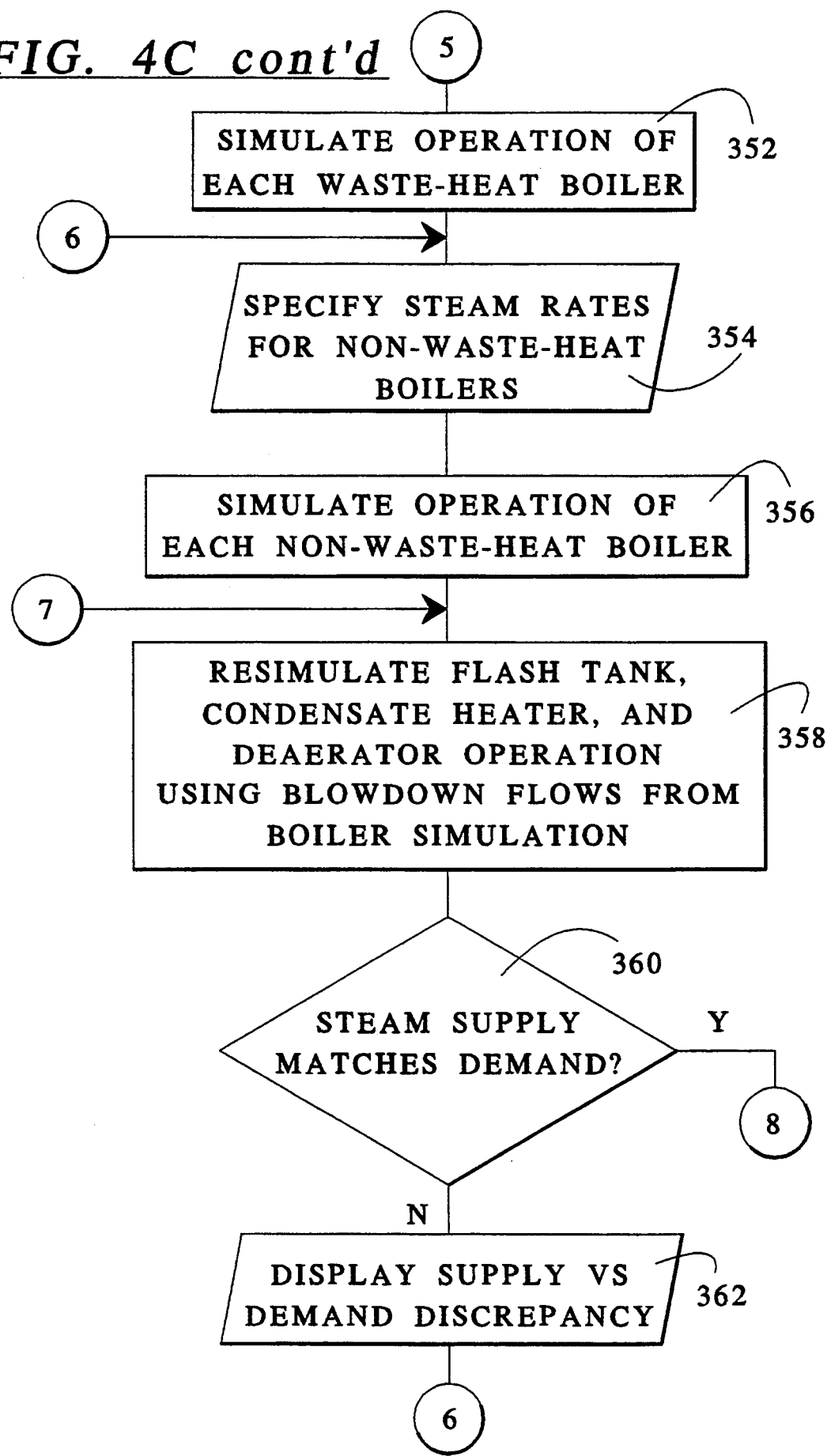

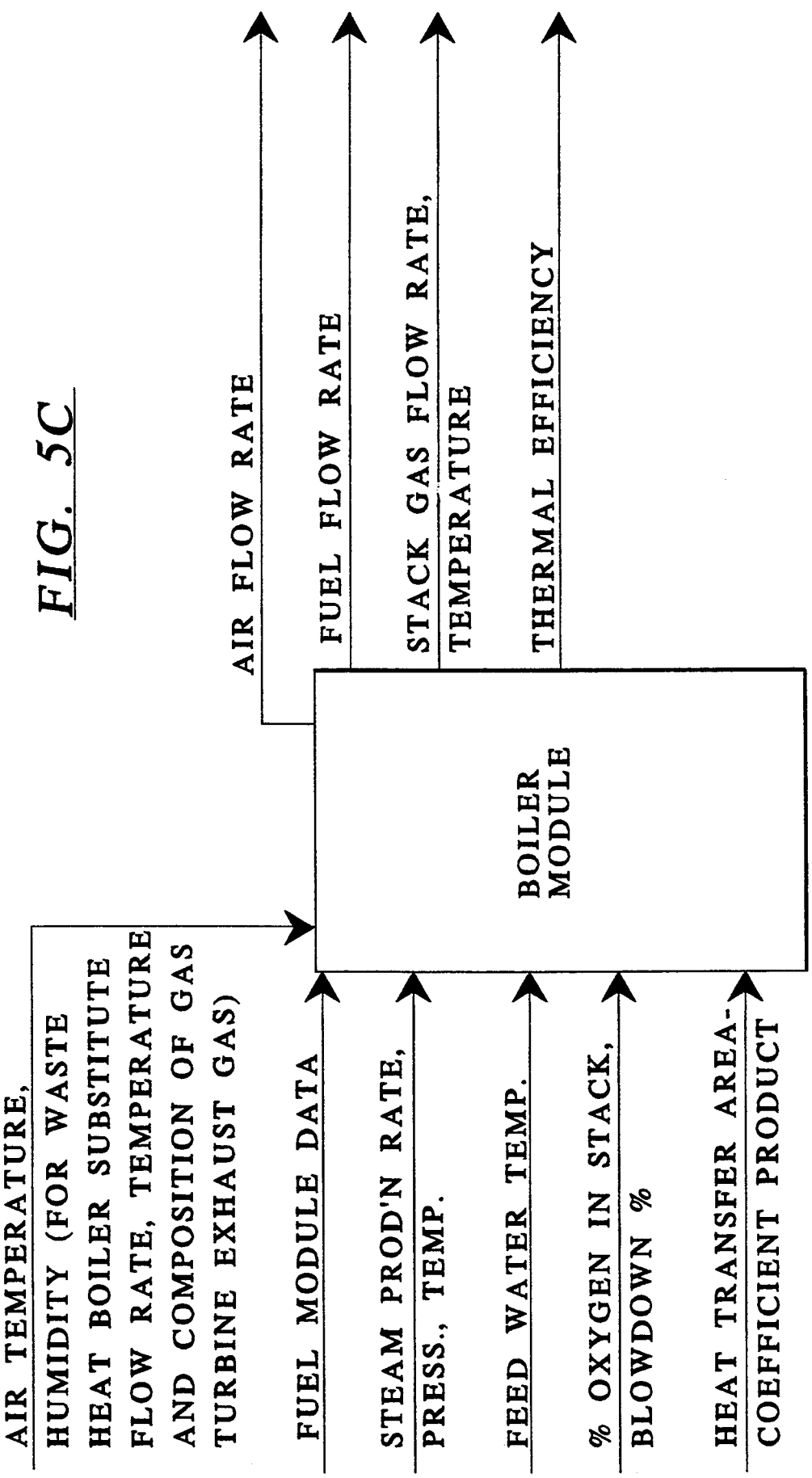

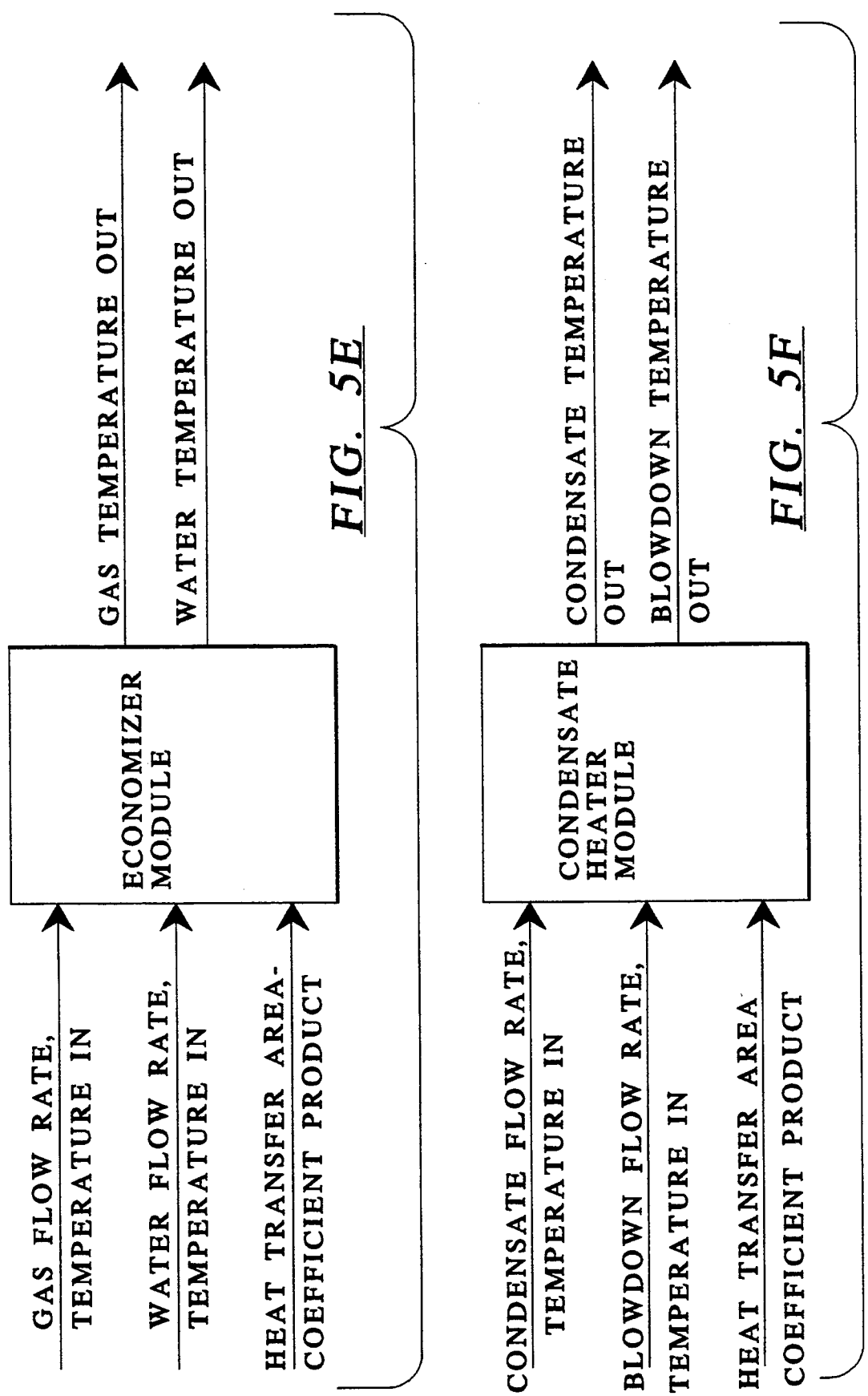

METHOD AND APPARATUS FOR POWER PLANT SIMULATION AND OPTIMIZATION

FIELD OF THE INVENTION

The present invention relates to a method and apparatus for simulating the components and overall system of a steam power plant for the generation of electrical energy, and to the optimization of the operating characteristics of the power plant system. More particularly, it relates to a method for simulating and optimizing a power plant having components made up of steam turbines and gas turbines, together with boilers for powering the steam turbines, and associated apparatus such as economizers, deaerators, preheaters, pressure reducing valves, compressors, pumps, fans, and other auxiliary powerhouse equipment. The optimization of the present invention configures the components of the system for minimum operating cost for any given requirement for output power and output steam flows at various pressures, and a given cost for fuel and additional electric power which may be required to be purchased to satisfy an energy demand not satisfied by the power plant.

BACKGROUND

A complete power plant, including multiple turbines of various types and associated equipment, represents a very complicated system, and the operation of various components affect each other, so that a change in the operating mode of one component of the system affects the operation of other components, with varying results. In order to operate at maximum efficiency, each of the components must be "tuned" in its operational characteristics, so that the system, as a whole, operates with maximum cost efficiency in terms of the cost per hour of running the power plant at a given demand load, and the cost of excess electrical power which must be purchased from an outside source in order to make up the required total power demand. Thus, complexities have presented severe difficulties in the design and the operation of such power plants, and also represent complications in retrofitting process/powerhouse equipment or extension of an existing power plant. It has been customary to make educated guesses at the approximate operating characteristics of the various components during real time operation of the system as a whole, and to make minor adjustment in some of the operational characteristics of some of the components, as they are running, to see if an increasing cost efficiency results. This is a difficult process, however, since it is time consuming and requires highly skilled personnel in order to make the educated guesses and to determined what characteristics of what components to alter. Moreover, the results of such alterations are not known until after the passage of time, during which unintended side effects may occur.

Frequently, the alteration of operating characteristics of one or more components has unforeseen results, with the overall effect that although efficiency of one portion of the system is improved, the overall efficiency of the system deteriorates. Moreover, the resulting inefficiency may not be realized or noticed, until some later time, at which in-plant measurements are taken, so that the real time operation of the plant at lower than peak efficiency represents an economic loss in the operation of the equipment.

The optimization of the system is a continuous process, because the operating characteristics of the various components change with time, and it is necessary from time to time to take one or more components out of service, without interrupting operation of the power plant, for routine maintenance, etc.

Accordingly, it is desirable to provide a method and apparatus for simulating the individual components and the overall system of a power plant, and for optimizing the entire system, so that a given set of operational parameters can be evaluated, whereby optimum operating characteristics may be determined without requiring operation of the power plant at a less than optimum cost efficiency. It is also desirable to provide means for assuring the identification of a global best optimum solution instead of merely a "local solution", inferior to the global optimum.

BACKGROUND OF THE INVENTION

It is a principal object of the present invention to provide a system for simulating a complex power plant, so that a given set of operating characteristics can be evaluated in terms of the cost efficiency of the overall system, to find a global optimum.

It is another object of the present invention to provide such a system, in which individual components can be adjusted, so that their individual characteristics can be evaluated, either alone, or in the context of the overall system.

It is a further object of the present invention to provide such a system in which random variations can be made in the characteristics of all of the variable operating characteristics of the system, so that the optimum cost efficiency of the plant as a whole can be determined.

It is another object of the present invention to provide such a system in which facilities are provided for specifying the inclusion or exclusion of any given piece of equipment, or the change in characteristics thereof, to allow evaluation of the system after the modification or replacement of one or more components thereof.

The apparatus and method of the present invention has the advantage of enabling the design of a power plant for a given required output power, specifying the components of such a power plant from among any number of components which are available to the simulation. In this way, a power plant can be designed initially by selection of the appropriate components, with the appropriate characteristics, with little risk that the plant is overdesigned or underdesigned, and with the foreknowledge of the exact operating cost of the overall system under given conditions.

It is also possible to simulate an existing system, and determine the optimum characteristics of each component thereof, resulting in optimum cost efficiency of plant operation.

It is also possible to study the effects of modification of the system, either by adding components, or by altering existing components. In this way, the power plant can be modified or extended or units can be retrofitted to make use of emerging technology, or simulate and optimize the effects of new powerhouse equipment that does not currently exist in the powerhouse.

It is also possible to study the effect of removing one or more components from the system, such as for routine maintenance for replacement, so that the optimum parameters of operation of each of the several components can be determined, thus allowing maximum cost efficiency of the plan during the interval of such maintenance.

These and other objects and advantages of the present invention will become manifest by an inspection of the following description and the accompanying drawings.

Information concerning the component equipment of power plants, and characteristics thereof are described in the literature, for example "Steam/Its Generation And Use", Babcox and Wilcox, New York 1978; "The Energy Cogeneration Handbook, Criteria For Central Plant Design", (Polimeros) Industrial Press, Inc. 1981; "Handbook of Industrial Gas Utilization" (Prichard, Guy and Connor) Van Nostrand, 1977; and "Practical Techniques For Saving Energy In The Chemical, Petroleum and Metals Industries", (Sittig) Noyes Data Corporation, 1977. These and other available like texts describe the operating characteristics and the algorithms for determining performance data at any operational point, from a given set of initial conditions.

BRIEF DESCRIPTION OF THE DRAWINGS

Reference will now be made to the accompanying drawings, in which:

FIGS. 5A-5K comprise a set of information flow modules illustrating the algorithms applicable to each of the components in FIG. 1.

DESCRIPTION OF THE PREFERRED EMBODIMENT

Figure 1:
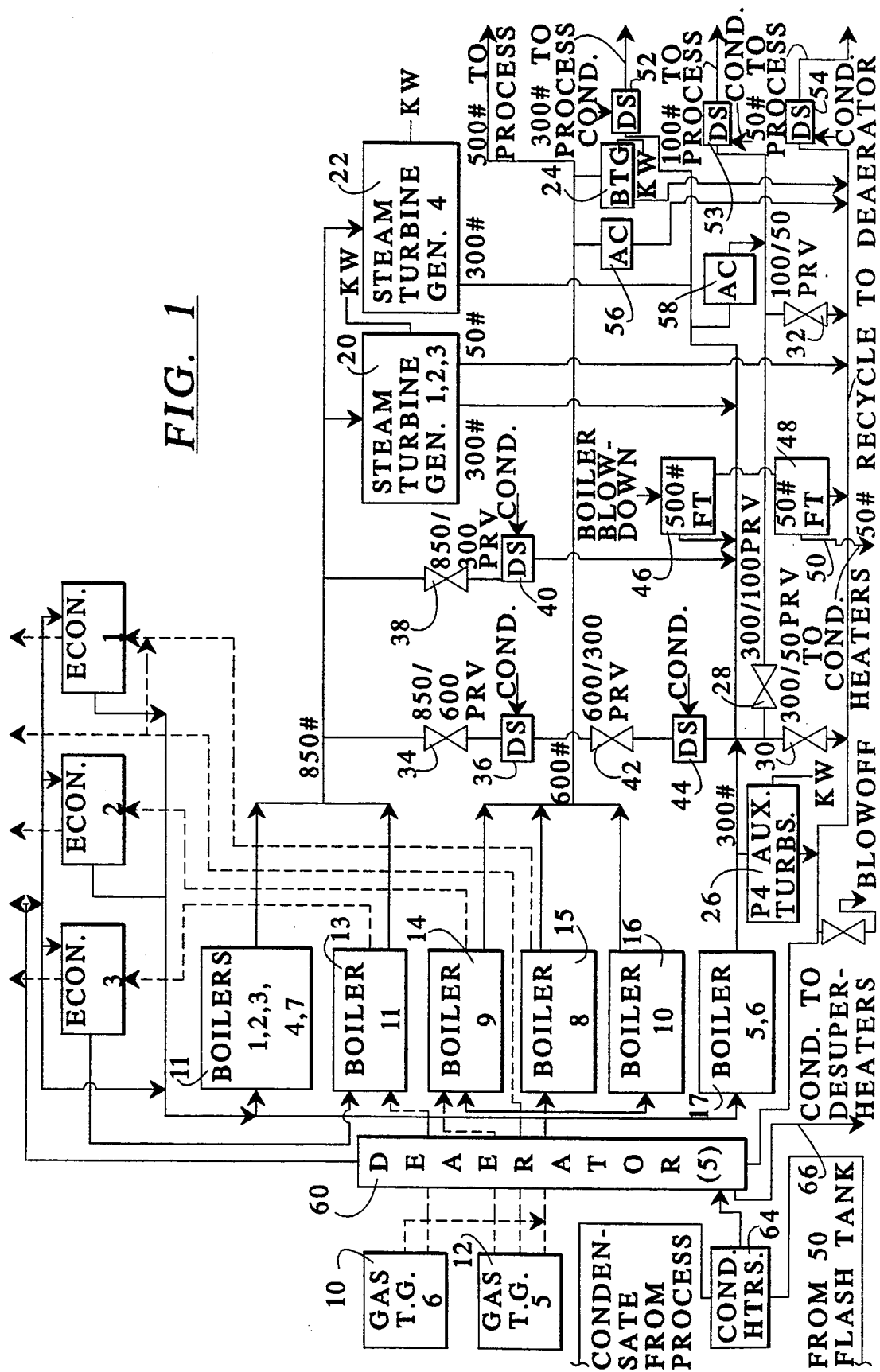
FIG. 1 is a functional block diagram of an example power plant which may be simulated and optimized by use of the present invention.

FIG. 1 illustrates a typical power plant system, which may be simulated and optimized by means of the present invention. The overall system incorporates a pair of gas turbine generators 10 and 12 (also known as gas turbines), and six sets of boilers 11-17. The boilers in sets 13, 14 and 15 are heated at least in part by the exhaust gases from the gas turbine 10 or the gas turbine 12, or a combination of the two, respectively, while the other boilers 11, 16, 17 have an independent air supply (not shown).

The six boilers in sets 11 and 13 produce steam at a pressure of 850 psi, which is delivered to a set of steam turbine generators 20 and 22 and to the 850 psi header. Electrical energy is generated by the gas turbines 10 and 12, and by the steam turbines 20 and 22. The boilers in sets 14, 15 and 16 produce steam at a pressure level of 600 psi, which is required by the plant powered by the system of FIG. 1, for example, an alumina producing plant. The boilers in set 17 produce steam at a pressure of 300 psi, which is also required by the process plant. The 600 psi steam is delivered to a booster steam turbine 24, which also produces electrical power, and the 300 psi steam is delivered to auxiliary turbines 26, which also produce electrical power. The process plant also requires steam at 100 psi, and 50 psi. The 100 psi steam is derived from the 300 psi steam through a pressure reducing valve 28, and the 50 psi steam is derived from the steam exhaust of the turbines 20, 22 and 26, and also from the 300 psi and 100 psi sources through reducing valves 30 and 32.

Steam is made available to the 600 psi header from the 850 psi source, through a pressure reducing valve 34 and, a desuperheater station 36 (hereafter desuperheater), and to the 300 psi header through a pressure reducing valve 38 and a desuperheater 40. Similarly, the steam is made available to the 300 psi header from the 600 psi line through a pressure reducing valve 42 and a desuperheater station 44.

Flash tanks 46 and 48 are provided for accepting boiler blowdown, and supplying steam to the 300 psi header, and to the 50 psi header respectively. The flash tank 48 receives its input from the flash tank 46, and supplies hot water to the condensate heaters. Quench condensate is added to the desuperheaters 36, 40 and 44 and to desuperheaters 52-54 located in series with each of the steam headers at 300 psi, 100 psi and 50 psi.

An air compressor 56 is powered with steam at 600 psi, and exhausts the steam or condensate to the 50 psi header, and an air compressor 58 is powered by steam at 300 psi, and exhausts to the 100 psi header.

The 50 psi header is connected to a deaerators(s) 60 which supplies the deaerated water to three economizers 61-63. The three economizers are each heated with the exhaust gases from the boilers 13-15 as well as the exhaust gas from the gas turbine 12, and they supply heated water from the deaerators 60 to feed boilers 11-17. The boiler 13 receives its intake only from economizer 63, which is heated by exhaust gases from the gas turbine 10, after first heating the boiler 13. The other two economizers supply water to the other boilers in common.

Condensate heaters 64 are provided, for heating the condensate returned from the steam delivered to the process plant associated with the power plant of FIG. 1, and also receive hot water from the flash tank 48. It supplies its output to the deaerators 60. In addition, the deaerators supplies condensate to the desuperheaters 36, 40, 44 and 52-54, over line 66.

A flow control valve 68 is provided for the purpose of blow-off from the 50 psi header.

It can be seen that the main components of the system shown in FIG. 1 are related in complex ways. For example, the heat received by boiler 11, depends on the level of operation of the gas turbine 10, and its operation depends in part on operation of the economizer 63. The boilers 14 and 15 are dependent on operation of the gas turbine 12, and on their economizers 61 and 62. The other boilers depend on operation of economizer 61 and 62, which are affected by operation of gas turbine 12, and the boilers 15 and 16, and all of the boilers are affected by operation of the deaerators 60, which is also dependent upon operation of the gas turbines 10 and 12. Three sets of the boilers determine how much steam is delivered to the headers at 850 psi, 600 psi and 300 psi, and all three of these headers are related to the steam at 100 psi and 50 psi. The steam turbines 20 and 22 also affect the steam available at 300 psi and 50 psi, and the air compressors 56 and 58 both affect the steam headers at 600 psi, 300 psi, 100 psi and 50 psi. The booster turbine 24 and the auxiliary turbines 26 also effect the steam lines at 600 psi, 300 psi and 50 psi. The exhaust gases affect the temperature of the headers and the operation of the boilers and economizers, and these units affect the temperature of the gases in the stack.

It is apparent that adjustment of the operating characteristics of any one component, may result in maximum efficiency of that component, but since its effects are interrelated with other elements of the system, such adjustments may have overall disadvantageous effects on the system as a whole. Because of the complexity of the system, adjustments are not intuitive, and optimization is difficult.

The situation is complicated, when one or more of the components is taken out of service, for example, when one of the boilers is out of service for maintenance requiring adjustments on other components to achieve optimization under a different set of conditions.

The situation is further complicated, since the cost of operation of the overall plant, including the power plant of FIG. 1 and the process plant to which it supplies power, is dependent on external factors, such as the cost of fuel required for the gas turbines and the boilers and the cost of additional electrical energy which must be purchased for external sources, in order to supply the needs of the processing plant which cannot be supplied by the various turbines of FIG. 1. Since the cost of the fuel, and the cost of purchased power, changes from time to time, optimization of the power plant requires continual adjustment of the parameters, in response to the changing circumstances.

Figure 2:
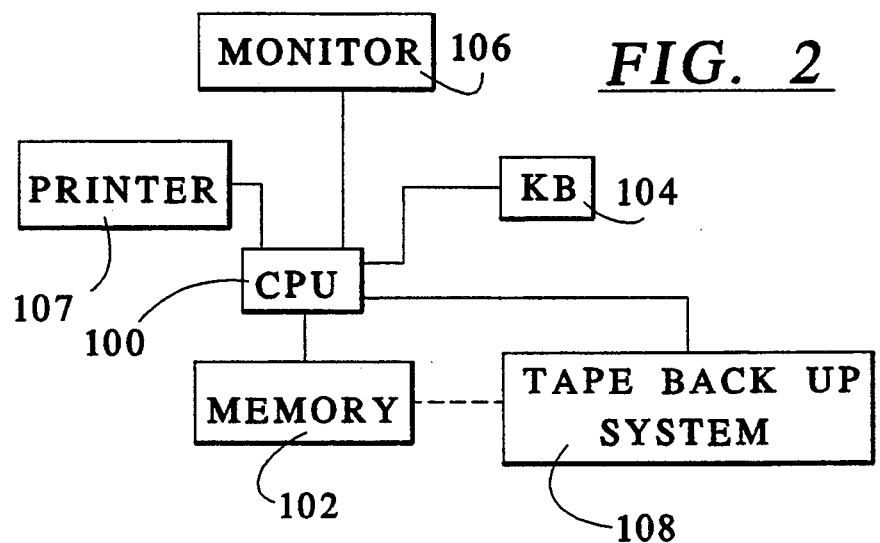
FIG. 2 is a block diagram of apparatus used to carry out the present invention.
Figure 3:
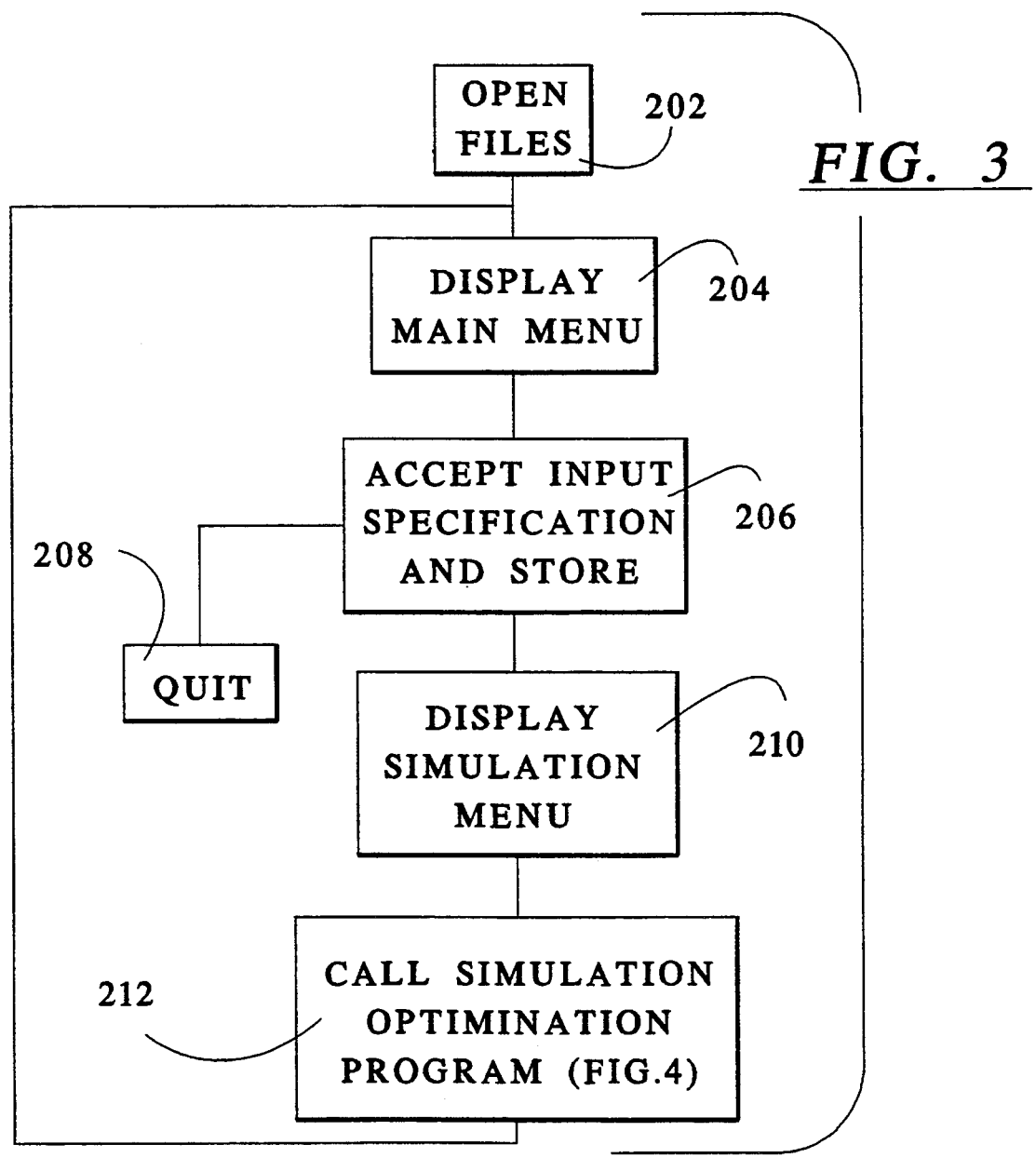
FIG. 3 is a flowchart of the main operating routines executed by the apparatus of FIG. 2.

Referring to FIG. 2, the apparatus for carrying out the present invention is illustrated. A central processing unit 100 is provided, which is connected with a memory unit 102. A keyboard unit 104 supplies operator input to the unit 100, and a monitor 106 displays information to the system operator. A printer 107 provides printed reports, if desired. A tape backup system 108 provides emergency complete information backup to units 100, 102 and 106.

The memory unit 102 stores data corresponding to the characteristics of each of the components of the system, and the manner in which they are interrelated. It also stores the operating routines which are used by the CPU 100 to manipulate the data in order to simulate operation of the powerhouse system. The keyboard unit 104 may be used by the operator to enter new data into the memory unit 102, whereby characteristics of the components may be changed, their interconnections may be modified, or given components may be included or excluded. The monitor 106 indicates to the operator the economic operating cost of the system as currently configured, given the operating characteristics stored in the memory 102. The monitor 106 can also indicate the individual characteristics of each component individually, and the operator may specify specific values for any such characteristics by entry thereof through the keyboard unit 104. All of such data may be printed by the printer 107, if desired.

In the optimization mode of operation, a program stored in the memory 102 randomly alters the variable operating characteristics of the components, and for each alteration, calculates the operating cost of the powerhouse system, displaying the results on the monitor 106. This process is iterated, until simulation of the system results in a lower operating cost than previously had been found, whereupon the improved operating cost is displayed on the monitor, and the appertaining operating conditions saved in the memory. The operator may then inspect the contents of the memory unit 102 to determine the proper setting for each of the components, so that the actual power plant may be adjusted to conform to the optimum settings.

The optimization program may be repeated indefinitely, with random variations of operating characteristics being investigated, until a still lower operating cost is found with a different combination of operation parameters. As more fully described hereinafter, the range of random variation is made smaller, following a period in which a lower operating cost solution is not found, to insure that a true local minimum is identified. When lower cost solutions are being found, the range of variation is made smaller, to promote rapid convergence to the global optimum. Part of the random variation includes the possibility of one or more components taken out of service or shut off, in which case the operating parameters for those components are set to zero or nominal values, and the operating characteristics of other components which depend on their operation are adjusted accordingly.

In the course of the optimization routine, certain parameters remain fixed, which are under control of the operator. For example, the cost of fuel, and the cost of extra electrical power are fixed, by the operator. In addition, the operator may fix one or more of the operating parameters for the various components, to account for practical conditions, and to define the changing operating characteristics of the equipment. For example, after cleaning, the boilers operate with an increased efficiency, and the heat transfer characteristics change during the use of the boiler until the next cleaning. The condition of the boiler at any time during its cleaning cycle, can be satisfied by the operator.

Each of the components of the powerhouse system is simulated by operation of a subprogram, stored in the memory 102, illustrated in diagrammatic form in FIGS. 5a-5k. The subprogram incorporates an algorithm which defines the pertinent mass and energy balance equations plus, in many cases, either a rate equation or an efficiency constraint. The specific algorithms may be selected from those well known in the art, and thus form no part of the present invention. Most rate equations have a transcendental form, which requires solution by trial and error, and the subprogram is able to perform several iterations until a solution is arrived at.

The design parameters which constrain operation of various types of equipment include parameters such as minimum and maximum permissible throughputs, heat transfer rate coefficients, thermodynamic efficiencies, and rates of heat loss. This information may be determined from manufacturer specifications and converted to data tables stored in the memory 102, which are readily accessible to the subprograms which require them. Thus, the algorithm in many cases may be a simple table look up operation, in which the dependent variables are determined directly from the values of the independent variables. In most cases, it is convenient to work backwardly, i.e., determining the required fuel input as a dependent variable, for example, in response to a specific output power level as an independent variable. The constraints may change with equipment age, usage, and maintenance practice. The changes are accommodated by allowing the operator to input new parameters by means of the keyboard 104.

New parameter values may also be calculated by the program on the basis of actual plant operating conditions inputted by the operator at keyboard 104.

Minimum and maximum permissible loads are set as design constraints. These design constraints are observed in the optimization routine, but may be selectively ignored in non-optimizing simulation of the system. This allows the operator to explore conditions in which loads are specified which exceed existing limits, without risking damage to the real power plant.

Boilers constitute a major series of components of the system of FIG. 1. The present invention allows the simulation of several different boiler types. A boiler may use air as a source of oxygen, or may use gas turbine exhaust gas as a source of oxygen, mixing the same with natural gas for fuel. Simulation provides for the presence or absence of an internal air preheater. The design constraints applicable to all boilers are the minimum and maximum permissible steam rates, the heat transfer rate coefficient, heat loss rate, and the boiler type (waste-heat gas or air), with or without an air preheater. Flow limits are specified as constants, while the rate coefficient and heat loss are linearly related to the stack gas flow rate. The boiler algorithm is diagrammatically illustrated in FIG. 5c.

For boilers having preheaters, the design constraints also embrace the heat transfer rate coefficient and the heat loss in the heater. A leakage percentage may also be specified to account for air which leaks from the air side of the preheater to the stack gas side.

Input specifications for all boilers are the steam pressure, temperature, demand, fuel gas composition and temperature, feedwater temperature, blowdown percent, percent oxygen in the stack gas, and either ambient air temperature and humidity, or waste gas composition and temperature. Boiler simulation calculations yield flow rates for fuel gas, air or waste heat gas, and stack gas, stack gas temperature, and boiler efficiency (energy delivered to the feedwater/steam stream, divided by total energy available). For internal air preheating, intermediate temperatures are also calculated.

The display produced on the monitor 106 for boiler simulation, includes display of enthalpies, stream and temperature combinations, the boiler heat duty, overall heat transfer coefficient, calculated long-mean temperature difference, and heat loss. For preheated air, the display includes the heat duty, overall heat transfer coefficient, and log-mean temperature difference in the preheater.

Figure 5A:
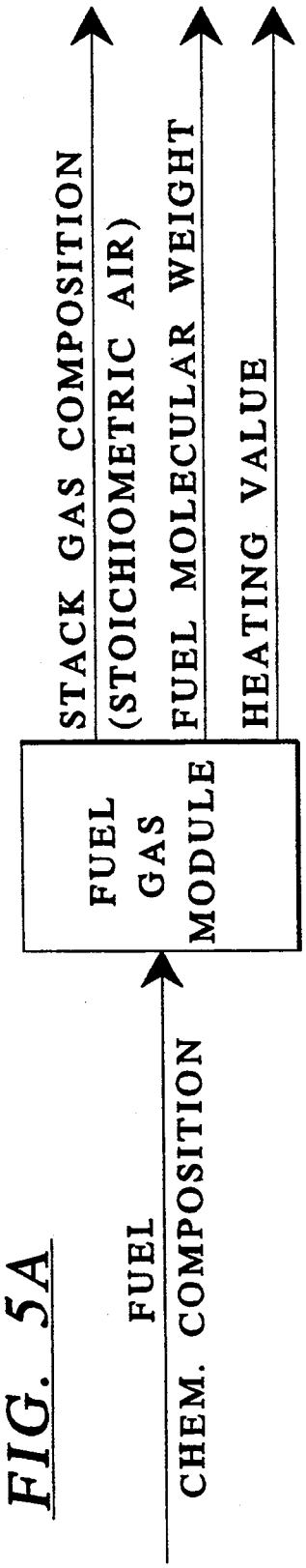
Figure 5B:
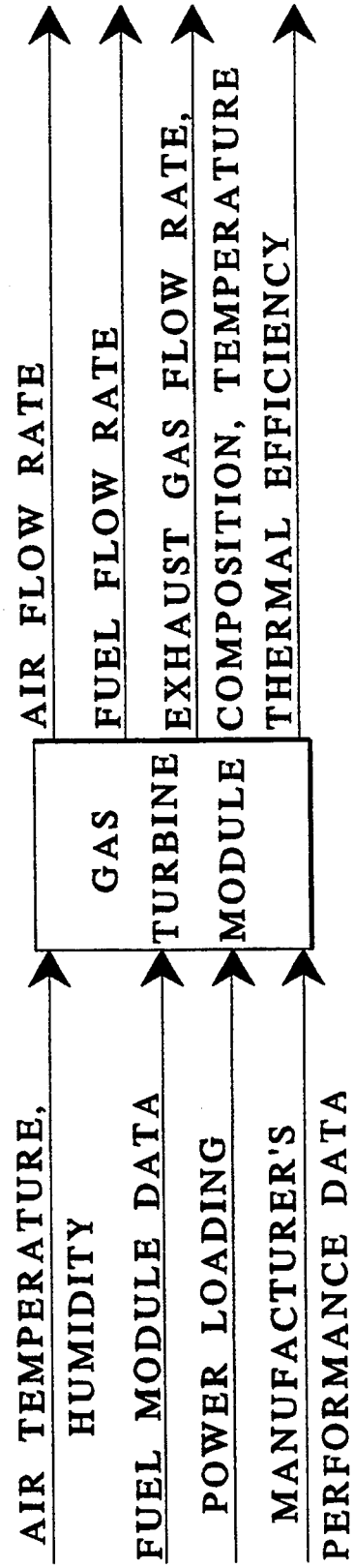
Figure 5D:
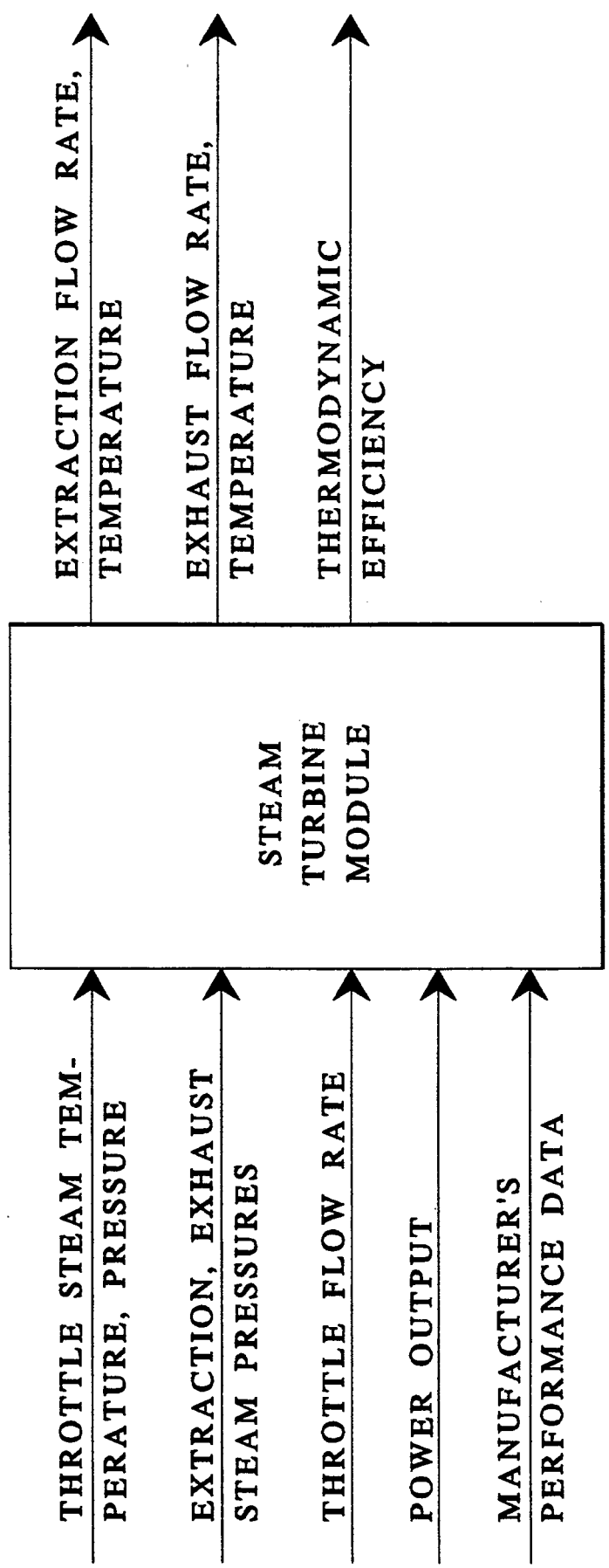
Figure 5G:
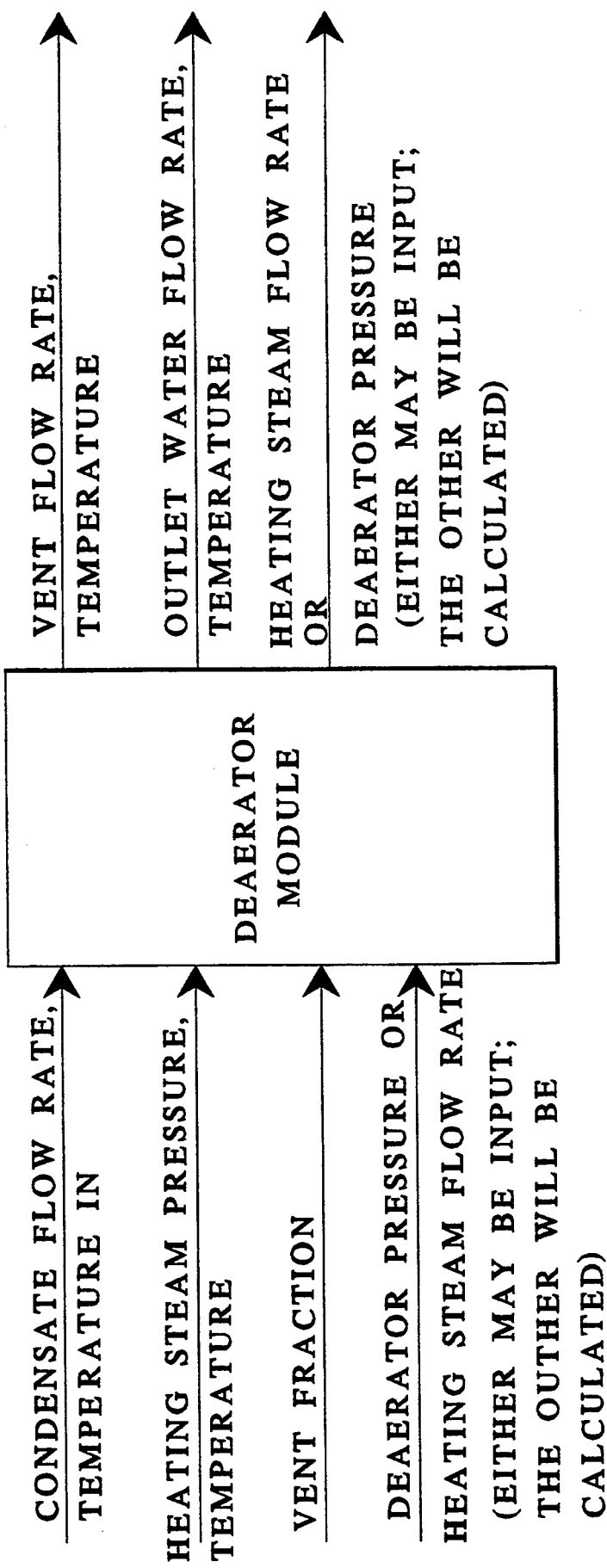
Figure 5H:
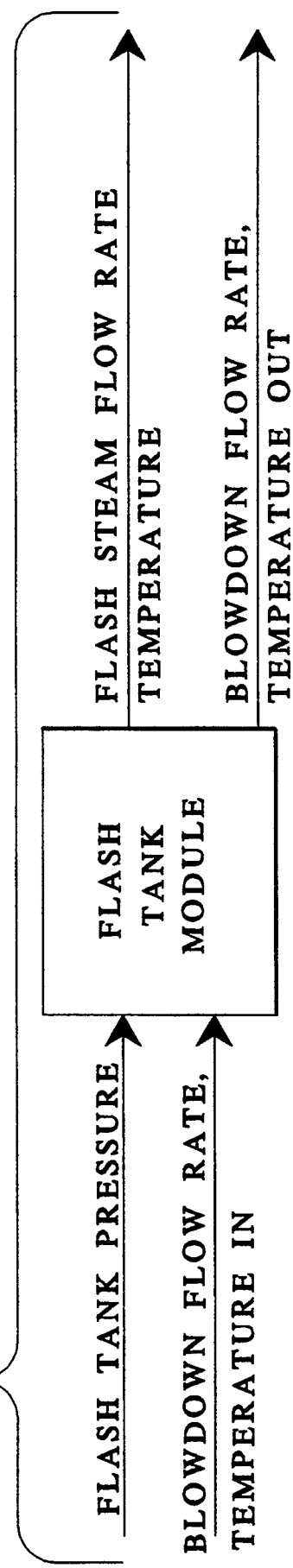

Steam turbines comprise other components of the powerhouse system of FIG. 1, the algorithm of which is represented in FIG. 5d. Such turbines may be single or two-stage steam turbine generators, with provision for extraction of steam between stages of the latter. The algorithm simulating the steam turbine component provides a two-stage model, which is readily adapted to a single stage by setting the extraction rate to zero.

Steam turbines are constrained by minimum and maximum permissible electrical power loads, thermodynamic efficiency, and heat loss. Efficiency is stored in data tables in memory unit 102, as a tabular function of throttle feed steam flow. Other constraints are constant. Input parameters which may be defined by the operator include the pressures for throttle and exhaust steam, and, for a two-stage turbine generator, extraction steam.

Simulation of the steam turbine generator requires input values for the pressure and temperature of the throttle steam. Other operating variables are power load, and the rates of throttle, extraction, and exhaust steam flow. Any two of these four variables may be specified as independent input variables, for an extraction turbine generator. Otherwise, only one independent value may be specified, whereupon the others are calculated.

The steam turbine simulation also calculates the overall water rate (in terms of pounds of steam flow per kilowatt hour of delivered power), the power theoretically obtainable from isotropic expansion, and the Rankine-cycle efficiency of the operation. The monitor 106 makes these parameters available for display, and can also display the throttle and exhaust steam enthalpy, the throttle steam entropy, the theoretical exhaust enthalpy and the heat loss.

With respect to gas turbine generators, the algorithm for which is illustrated in FIG. 5b, the only specifications prerequisite are the desired power output, the composition and temperature of the fuel gas, and the temperature and humidity of ambient air. All other constraining relationships can be derived from manufacturer's design specifications.

The input design constraints for each gas turbine generator are the maximum and minimum permissible electrical loads, the constants for linear equations expressing fuel enthalpy is a function of electrical load, exhaust flow rate as a function of ambient air temperature and heat loss as a function of electrical load.

The quantities calculated by the algorithm for gas turbines are fuel gas, air, exhaust gas rates, exhaust gas temperature, and efficiency (delivered power divided by total energy input). Additional information available for display includes enthalpy and molecular weight for the fuel gas, air and exhaust gas, the composition of the exhaust gas, and the turbine-generator heat loss.

Figure 5I:
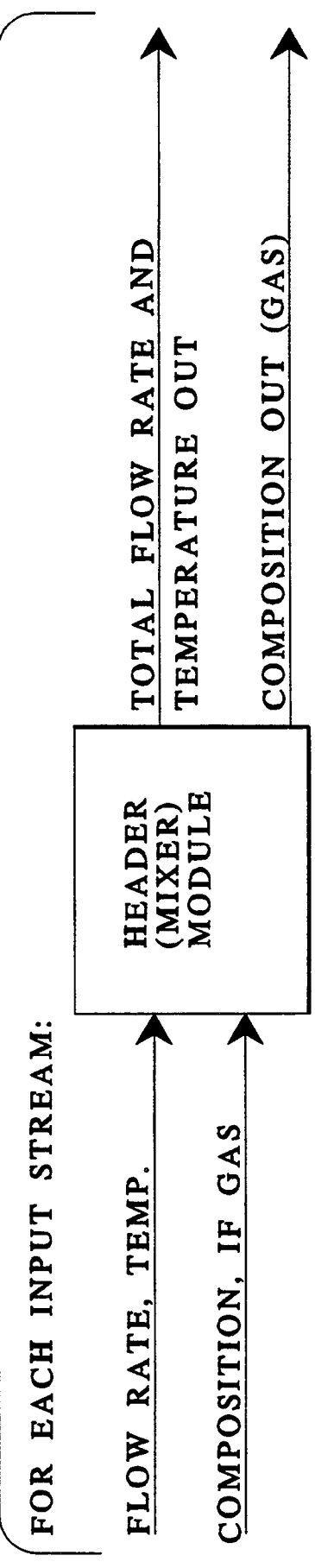
Figure 5J:
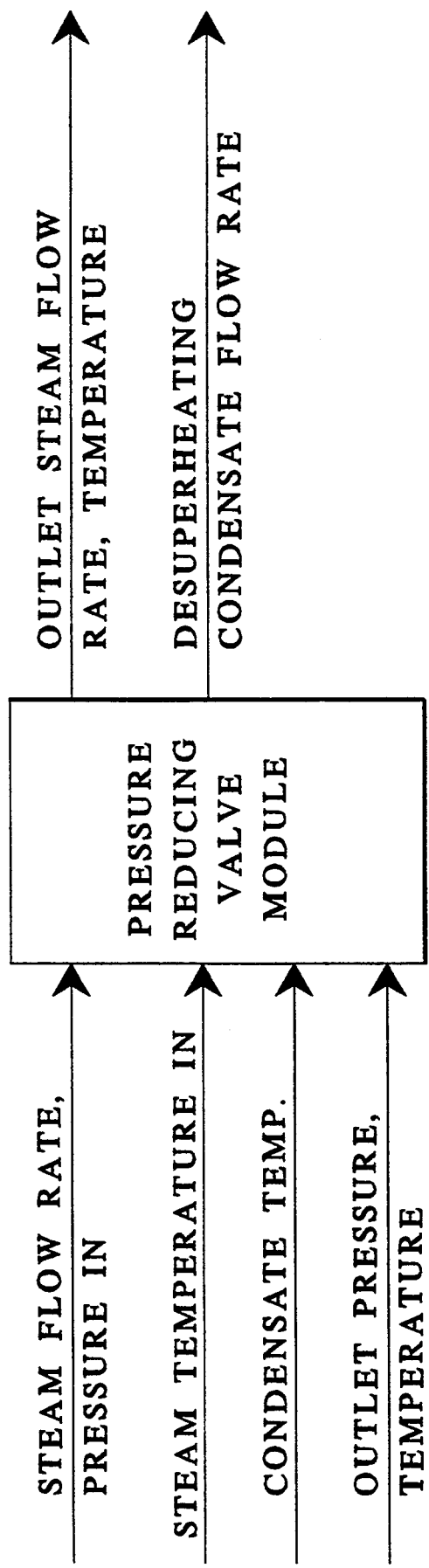
Figure 5K:
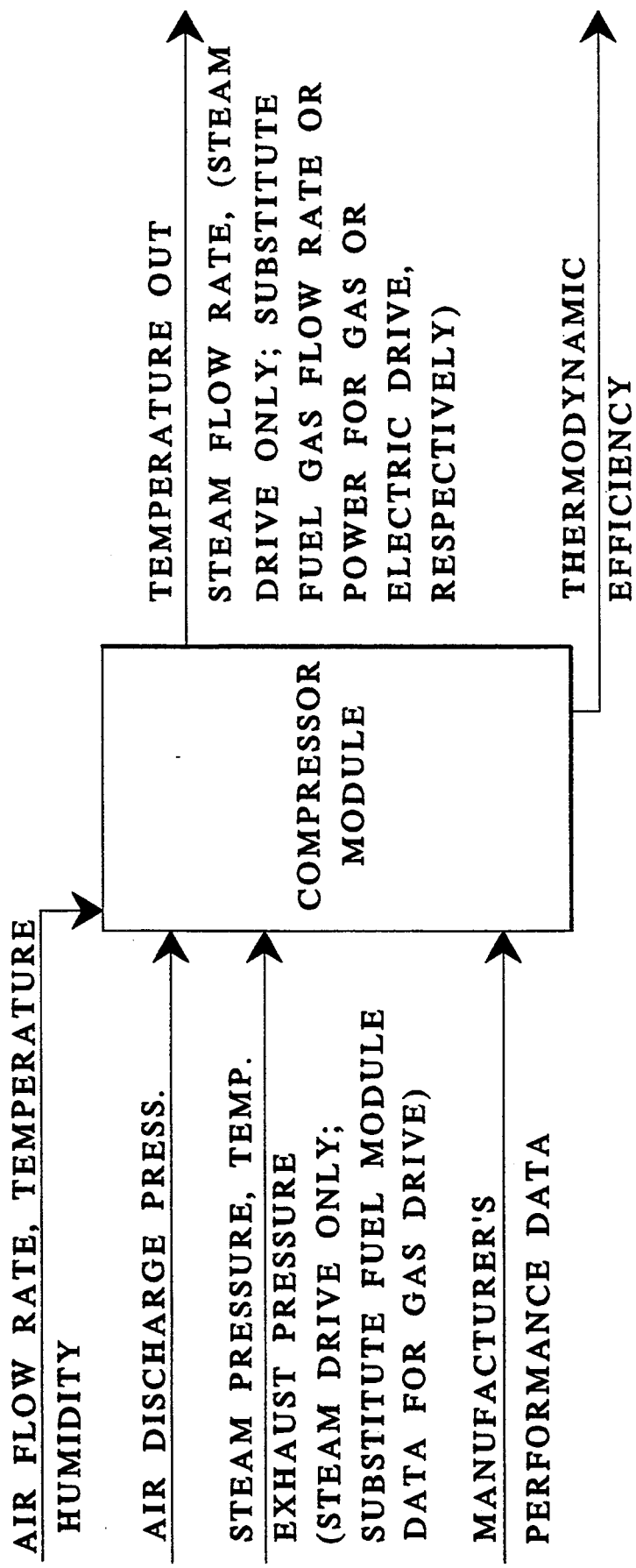

Other components of the system of FIG. 1 include air compressors, the algorithm for which is illustrated in FIG. 5k. Air compressors may be powered by electricity, steam, or natural gas. Simulations for all three types are available in the data table stored in the memory unit 102. The design constraint applicable to compressors are the lower and upper limits for air throughputs, the thermodynamic efficiency as a tabular function of air rate and drive type (electric, steam and/or natural gas). The thermodynamic heat capacity ratio Cp/Cv may also be specified. Input specifications common to all air compressors are the air flow rate and discharge pressure, and the temperature and humidity of ambient air. For steam driven compressors, the pressure and temperature of the feed steam and discharge pressure must also be specified. The parameters calculated by the simulation for air compressors include quantity of driving steam, electricity or gas, the energy actually delivered to the air stream, and the efficiency (equal to the delivered energy divided by the energy available from the input power source). For steam driven compressors, the temperature of the discharged steam is also derived.

The system of FIG. 1 incorporates three economizers 61-63, the algorithm for which is shown in FIG. 5e. Simulation of economizer operation is constrained by maximum permissible flow rates for both gas and water, values for the heat transfer rate coefficient as the function of the gas rate, heat loss, and the gas composition. Specifications pertinent to economizer simulation are the flow rates and inlet temperatures for both water and gas, the maximum permissible effluent water temperature, and the minimum permissible effluent gas temperature (to avoid condensation in the stack). The simulation calculates the temperatures of the effluent water and effluent gas, and makes them available for display on the monitor 106. Additional parameters which may be calculated and displayed are the enthalpy of all streams (inlet and effluent water and gas) and the economizer heat duty, heat loss, heat transfer coefficient, and log-mean temperature difference.

The condensate heater 64 (FIG. 5f) and deaerators(s) 60 (FIG. 5g) of FIG. 1 have design constraints which include a minimum deaerators pressure, the heater heat transfer rate coefficient and heat loss (both functions of blowdown flow) and deaerators heat loss as a function of deaerators pressure. The inputs required for simulation are the condensate flow rate and inlet temperature to the heater, the blowdown flow rate and last blowdown flash pressure, and either the deaerators pressure or the recycle steam rate.

The simulation calculates either the recycle steam rate or the deaerators pressure, depending on which was assigned as an input value. The result may be displayed along with the temperature of the blowdown entering the condensate heater, condensate and blowdown temperatures leaving the heater, deaerators temperature, and rates of vapor and total hot water flow from the deaerators. The monitor may also display heat loss and enthalpy data if desired.

The pressure reducing values, such as the valve 34 (FIG. 5k), all have specifications comprising the inlet and discharged steam pressures, the inlet steam flow rate and temperature, whether or not superheating is to occur, and constants for calculation of heat loss as a function of steam flow rate. If desuperheating is specified, the condensate temperature and desired effluent steam temperature must also be supplied by the operator.

The simulation program calculates the inlet, discharge, and condensate enthalpies, condensate and discharge flow rates, degrees of superheat in the discharge, and the valve heat loss, which parameters may be displayed on the monitor 106 for operator inspection.

Flash tanks such as the tanks 46 and 48 (FIG. 5h) are simulated from inputs specifying the two flash tank temperatures, the rate and temperature at which the blowdown enters the high pressure tank, and values for two sets of constants relating heat loss to flow rate. The results which may be displayed on the monitor 106 are the blowdown flow rates, temperature and enthalpy in and out of the tanks, effluent vapor rates and enthalpies, and the calculated heat loss.

The present invention can determine the quantities of auxiliary power or steam needed to drive condensate pumps, feedwater pumps, and boiler fans. The user specifies any additional needs for auxiliary power, steam or fuel gas as input values. As an option, the user may elect to specify all auxiliary needs as input values.

The air flow through both induced and forced draft boiler fans is calculated as directly proportional to the boiler steam load, with the manufacturer's rated load for the fan corresponding to the maximum steam load for the boiler. For pumps, the manufacturer's pump curves yield relationships for pump power as a function of throughput, which are stored in tabular form in the memory 102. The algorithm for calculating values of parameters depending on the fuel composition is illustrated in FIG. 5a. For each input stream, the algorithm is illustrated in FIG. 5i.

The entire powerhouse of FIG. 1 is simulated by the operator specifying the configuration in which the components are assembled into an overall flow diagram, such as that illustrated in FIG. 1.

With the configuration specified, such as FIG. 1, the simulation routine recognizes four different states of availability of individual equipment components:

(1) currently in use (on);
(2) currently off, but available for use as an optimization option (in which case the optimization routine randomly includes or excludes the component);
(3) existing but not currently not available; and
(4) nonexisting/hypothetical equipment, subject to design criteria.

Other major constraints are the external demands for power, compressed air, and steam for each of the four supplied header pressures, and the various operating characteristics inherent in the design of the equipment, which are inherently included in the algorithms of FIGS. 5a–5k, for example, in the form of characteristic tables and the like. For non-optimizing simulations, the operator must also specify how boiler, economizer, turbine-generator, air compressor, and waste-heat gas loads are to be distributed. These parameters are randomly varied during optimization.

For given input constraints, the simulator calculates all other operating conditions and related information, such as steam rates, compositions, temperatures, enthalpies, etc. It also calculates the combined cost of fuel gas and purchased electric power (the major variable cost of day-to-day powerhouse operation).

In simulating a system such as that illustrated in FIG. 1, the method of the present invention forms the following steps in sequence, after the required input data is specified by the operator.

(a) Estimate total desuperheater condensate flow, blowdown flow and temperature to each flash tank, and the power requirement for air compressors and auxiliaries.

(b) Simulate the flash tank operation to determine flash steam going to the 300 psi and 50 psi headers, and residual blowdown flow to the condensate heater.

(c) Calculate total condensate flow, equal the total processed steam demand plus blowdown plus deaerators vent steam.

(d) Simulate condensate heater and deaerators operation.

(e) Estimate water temperatures leaving the economizers and in the boiler feedwater headers.

(f) Simulate air compressor and gas turbine generator operations, using specified throughputs.

(g) Simulate waste-heat boiler operation, and calculate temperatures of 850 psi and 600 psi steam after mixing boiler effluents.

(h) Iterate steps (b) through (d) until overall water balance converges.

(i) Calculate feedwater pump loads and steam needed for all steam driven auxiliaries.

(j) Simulate steam turbine generator operations and flow to steam headers in high to low pressure order, calculating sub-flows through equipment and pressure-reducing valves as needed.

(k) Calculate deaerators pressure based on flow of 50 psi recycle steam from step (j).

(l) Iterate steps (g) through (k) until calculated deaerators pressure converges to input specification.

(m) Simulate economizer operation to obtain outlet water temperatures.

(n) Iterate simulation of waste-heat boilers and gas flow economizers until water temperatures converge.

(o) Complete calculations not involved in iterative calculations, including final calculation of combined cost of fuel gas and purchased power.

Referring to FIG. 2, the main or executive program is illustrated. When first started, the unit 202 receives control and opens the files needed by the routines described above. Then unit 204 receives control and displays the main menu, giving the operator the opportunity to make changes in any of the parameters, the interconnect tables, etc. The unit 206 receives control, accepting and storing the input specifications entered by the operator. If the operator selects Quit, then unit 208 receives control and the process ends. Otherwise, unit 210 receives control, which displays a simulation menu, by which the operator may inspect the current values of the various parameters. Then, in response to operator input, unit 212 receives control, which performs the procedures described above in connection with FIG. 4a–FIG. 4g.

Reference will now be made to the routines illustrated in FIG. 4a–4g, which describes simulation optimization of the powerhouse system illustrated in FIG. 1, using the algorithms applicable to each of the components as illustrated in FIG. 5. These algorithms are typically embodied in the form of subprograms or the like, which may represent tabular data, curves, charts and the like constructed from data supplied from the manufacturers. Accordingly, the algorithms applicable to individual components will be not be described in detail, but will be referred to in the form illustrated in FIG. 5.

In FIGS. 4a–4g, the steps of the method of the present invention are illustrated in the form of individual steps. It is contemplated that the steps may be performed by execution of a computer program using a computer system such as that illustrated in FIG. 2, which may conveniently be a personal computer or the like. In that case, the steps illustrated in the flowcharts of FIGS. 4a–4g constitute steps which are formed in the course of execution of a program stored in the memory 102, and performed in the sequence illustrated. Such a program can be readily written by a programmer from the information hereinafter described relating to the sequence of steps and the necessary input data, using the algorithms generally known in the art and illustrated in general in FIG. 5. In lieu of any specific algorithm, a series of tables may be used identifying the results flowing from any given combination of independent variables, and such tables can be stored in the memory 102 and accessible to the processing unit 100. In this way, the results indicated by the algorithms illustrated in FIG. 5 are derived without the explicit solution of any equations.

As an alternative form of the present invention, the apparatus of the present invention may instead take the form of a special purpose computer, in which the various boxes illustrated in FIG. 4a–4g comprise registers, comparators, logic units, and the like, dedicated to the individual steps of the method, so that the steps of the method are performed as a result of the output determined by each step, furnishing an input to each succeeding step. For this reason, the boxes illustrated in FIGS. 4a–4g will be referred to as "units", which refers their character as either steps of the computer program or method, or hardware for performing such step, as the case may be.

Figure 4A:
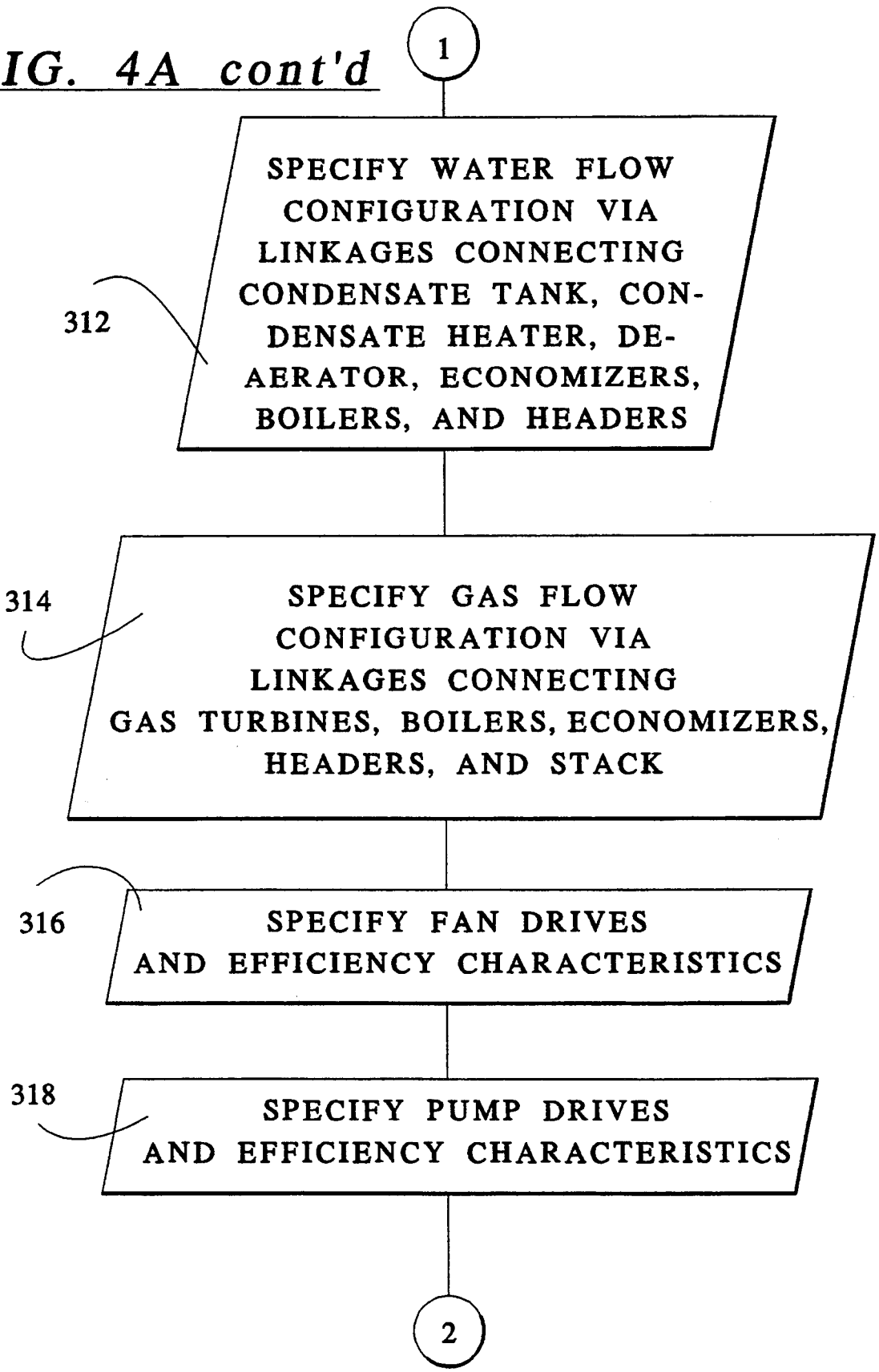
FIGS. 4A-4G comprise a set of flowcharts illustrating the sequence of subroutines executed by the apparatus of FIG. 2, under control of the routine illustrated in FIG. 3.
Figure 4B:
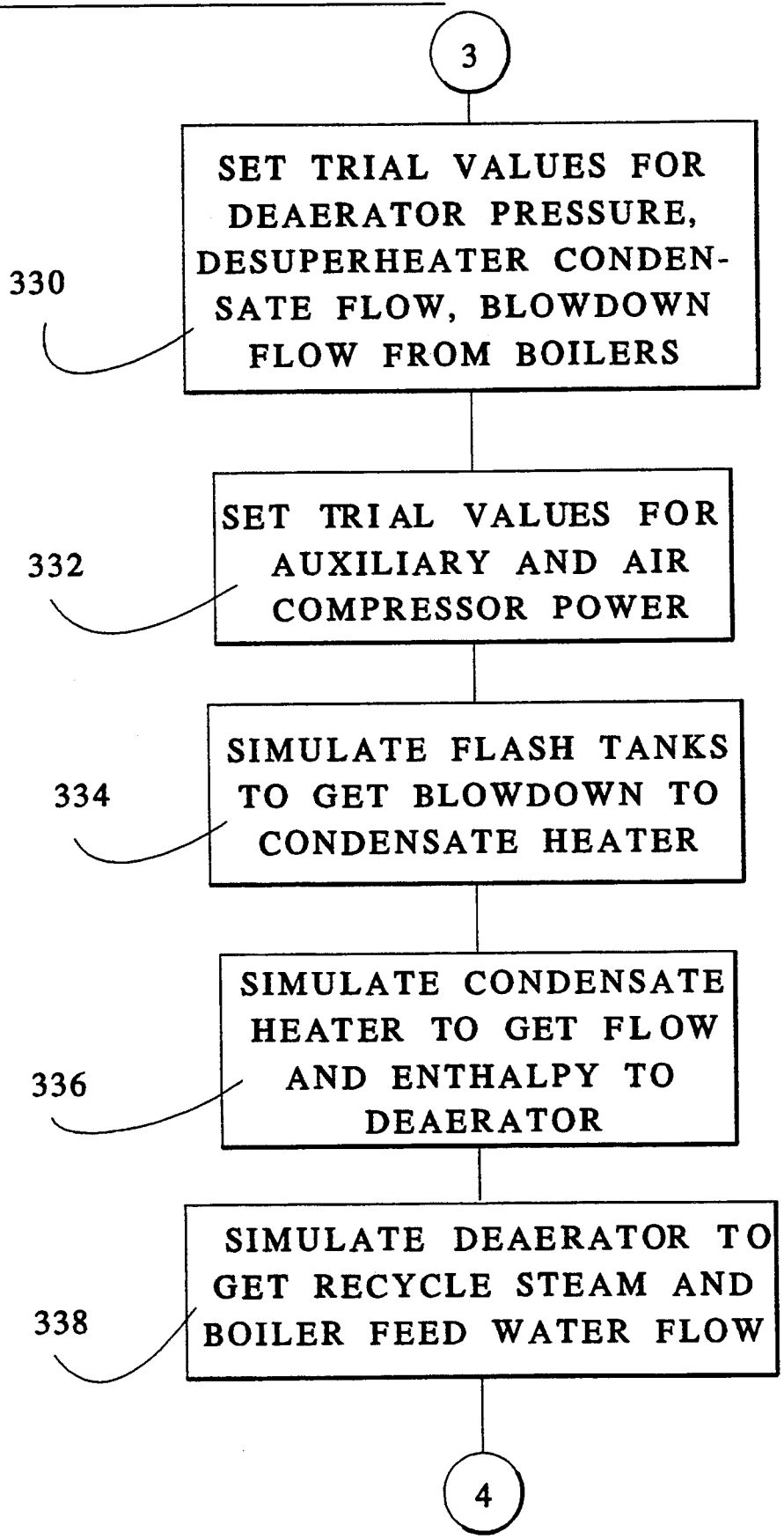
Figure 4C:
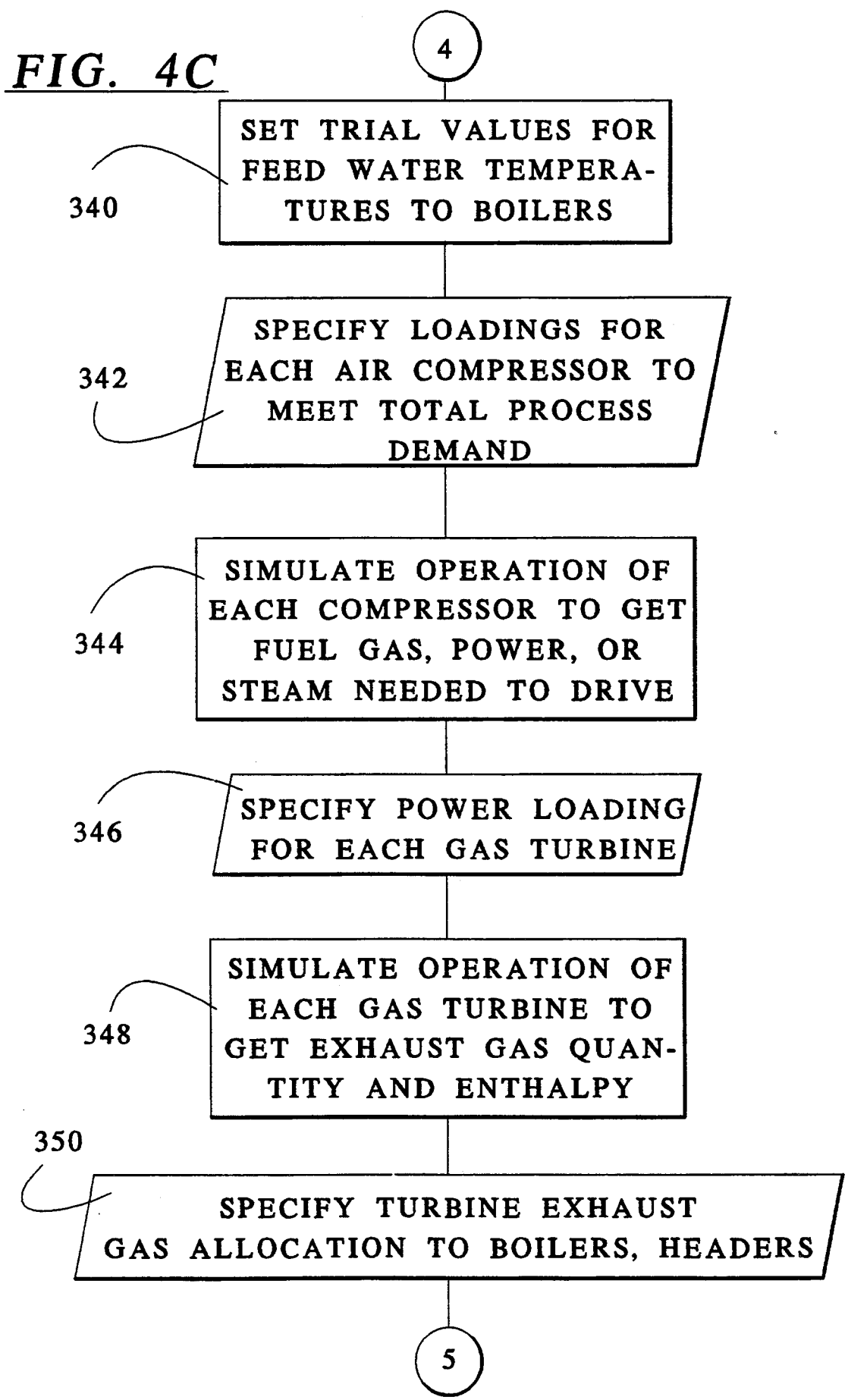

When the routine of FIG. 4a is started, unit 302 receives control, by which the operator is prompted to input, using the keyboard 104, data consisting of steam header pressures, boiler pressures, and the minimum deaerators pressure. When these parameters are entered, control passes to unit 304, which prompts the operator to enter parameters corresponding to the steam turbine throttle, extraction, and exhaust pressures. When these parameters are entered, control passes to unit 306, which prompts the operator to enter parameters corresponding to compressor drives, and the feed and exhaust pressure for the steam drive.

When these parameters have been entered, control passes to unit 308, which prompts the operator to enter parameters corresponding to pressure reducing valve pressures, and whether desuperheating is to be performed or not. When these parameters are entered, control passes to unit 310, which prompts the operator to enter the recycle steam pressure and the flash tank pressures. When this data is entered, control passes to unit 312, which prompts the operator to enter the water flow configuration which connects the condensate tank, the condensate heater, the deaerators, economizers, boilers and headers. The data thus specifies and causes the routine to adopt the water flow paths as indicated in FIG. 1, for example, in which the condensate from the process and from the flash tank 48 is supplied to the condensate heater 64 and from there to the deaerators. The flow is hence from the deaerators to the economizers, and then to the boilers, which produce the steam flow at the headers for the various pressures.

The connections of the various components of the system are contained in a series of tables, stored in the memory unit 102. These tables are constructed by the operator, as he defines the components in the system and their interconnections. For example, for the system illustrated in FIG. 1, the 850 psi header is connected to the outputs of boiler sets 11 and 13, and to the inputs of valves 34 and 38, and to the inputs of steam turbine generator sets 20 and 22. These connections are stored in a table. As each of the generators in the sets 20 and 22 are simulated, a value is derived for the required input steam flow for each, based on their operating conditions, and such is accumulated as a total flow demand for the 850 psi header, along with the steam requirements for the valves 34 and 38. Since each of the above generators and valves are linked with the 850 psi header by the table, such accumulation proceeds as each unit is simulated. Subsequently, simulation of the 850 psi header requires that the total steam demand for the header be satisfied by the boiler sets 11 and 13, which are linked to the header by the table. Thus the boilers in these sets have their operating characteristics adjusted so that their combined steam flow equals the demand required by the 850 psi header. Such adjustment may be by randomly setting the steam flow from all but one such boiler, within operating limits, with the last boiler having its flow set so that the total steam flow matches the demand. This allocation is between the boilers in the sets 11 and 13 because those boilers are linked to the 850 psi header by the table referred to above.

A separate such table is provided for every interconnection in the system, such as the hot water flows to the boilers from the economizers 61–63, and the flows to the economizers from the deaerator(s) 60, so that these flows can be allocated among the associated components to equal the required total. Other connection tables relate the flows of exhaust gasses from the gas turbine generators 10 and 12 through the boilers and economizers and the stack, the condensate flows, the supply of natural gas or other fuel to the gas turbine generators, boilers, and other equipment powered thereby, the electrical outputs of the various generators, and the demands of the process plant for electrical energy, steam at various pressures and compressed air. If desired, the various interconnection tables may be combined into a single table, or organized into separate tables for each individual component. Since a complete listing of such tables would be merely redundant with what is shown and implied in FIG. 1, it is omitted from this description. It should be understood, however, that by merely altering such tables, the operator can change the configuration of the powerhouse under consideration, by adding or deleting or reconnecting the various components. Each component in the system has a simulation module such as those illustrated in FIG. 5, and by changing the simulation modules, the operator can consider the effect on the powerhouse system of components which may not even exist. In addition, the number of boilers in each of the boiler sets 11–17 may be increased, as well as the number of gas turbine generators, steam turbine generators, economizers, deaerators, etc. The added units in any of the sets may have different characteristics from the others by providing different algorithms for them, or by adjusting the constants inherent in the algorithms illustrated in FIG. 5. When this data is entered, control passes to unit 314, which prompts the operator to enter parameters describing the gas flow configuration connecting the gas turbines, boilers, economizers, headers and stack. This causes the routines to connect the gas flow as illustrated in FIG. 1, for example, in which the exhaust gas from the gas turbines is directed to the boilers and economizers and thence to the stack. When these parameters are entered, control passes to unit 316, which prompts the operator to specify fan drives and efficiency characteristics. This causes the program to respond to the power requirement for the fans from electrical, natural gas or steam sources. When this data is entered, control passes to unit 318, which prompts the operator to specify pump drives and efficiency characteristics. This allows the program to determine the power requirements from electrical, natural gas or steam sources, for driving the pumps, and the amount of power thus required.

All of the parameters entered by the operator as discussed above, are stored in the memory unit 102, and are available to the CPU 100 for use in the simulation optimization routines described hereinafter.

Following unit 318, unit 329 (FIG. 4b) receives control which prompts the operator to specify ambient conditions, such as air temperature, humidity, the fuel gas characteristics, and the condensate temperatures. When these parameters are entered, unit 322 prompts the operator to specify boiler blowdown and deaerators vent percentages. When these parameters are entered, control to passes to unit 324, which prompts the operator to enter steam header temperatures and process plant steam demand for each header pressure. When these parameters are entered, control passes to unit 326, which prompts the operator to enter process plant electrical power and compressed air demands, and required air pressure to be delivered by the air compressors of FIG. 1. When this data is entered, control passes to unit 328, which prompts the operator to input parameters corresponding to the need for auxiliary power, steam, and fuel gas.

As the parameters are entered, they are stored in the memory unit 102, and available to the CPU 100, in completing the subsequent process steps.

Then unit 330 receives control, by which trial (temporary) values are set for deaerators pressure, desuperheater condensate flow, and the blowdown flow from boilers. These trial values are arbitrary, because they are merely temporary, and are changed during iteration sequences described hereinafter, to conform to the actual operating conditions, given the input parameters. However, since some initial values are required for these parameters, in order to supply data to algorithms within the repetitive cycle, during which the operational parameters converge, the speed of convergence is facilitated by setting values to these parameters which are expected to in the "ball park". When an actual power plant is being simulated, the trial values can be set to values actually measured during typical operation of the power plant. Then control passes to unit 332, which sets trial values for auxiliary and air compressor power. This is necessary when the auxiliary equipment and air compressors are driven by steam, since the use of this equipment represents the drain on the steam available on the headers of various pressures as inputs to the auxiliary and air compressors, and on the return lines from the outputs thereof. When the auxiliary and air compressors are driven by electric power, or fired by natural gas, the power requirements are determined directly from the parameters entered by the operator, and the efficiencies of this equipment.

Then unit 332 receives control, which simulates a flash tank, from the available data, to arrive at the amount of blowdown for the condensate heater. Then unit 336 receives control, which simulates the condensate heater, to get the flow enthalpy to the deaerators, after which unit 338 simulates the deaerators to get the recycled steam and the boiler feedwater flow. Then unit 340 receives control, which sets (temporary) trial values for the feedwater temperatures to the boilers. This number, which varies as a result of subsequent procedures, can be set to any value near the typical measured value for this parameter. Then unit 342 receives control, which prompts the operator to enter data corresponding to the loading for each air compressor, required for the total process demand (including the process plant powered by the powerhouse). Then unit 344 receives control, which simulates operation of each compressor, in order to get the fuel, electric power, or steam needed to power the compressors. Then unit 346 receives control, which prompts the operator to enter the power loading for each gas turbine. When this is entered, unit 348 receives control, which simulates operation of each gas turbine to calculate the exhaust gas quantity and enthalpy. Then unit 350 receives control, which prompts the operator to specify the allocation of the turbine exhaust gas to the boilers and headers. The data entered by the operator in unit 350 allows the realization of a proportion of the exhaust gas produced by the gas turbine 10 to be supplied to the boiler units 13 and 15, while the exhaust gas from the gas turbine unit 12, can be supplied to the boiler 9, or directly to economizer 61 or directly to the stack.

When this data is entered, then control passes to unit 352, which simulates the operation of each waste-heat boiler, namely boiler units 13–15, which are powered by the exhaust gas from the gas turbines 10 and 12. Then unit 354 receives control, which prompts the operator to enter the steam rates for the non-waste-heat boilers, namely the boiler units 11, 16 and 17. When this data has been entered, unit 356 simulates operation of these boilers.

Figure 4D:
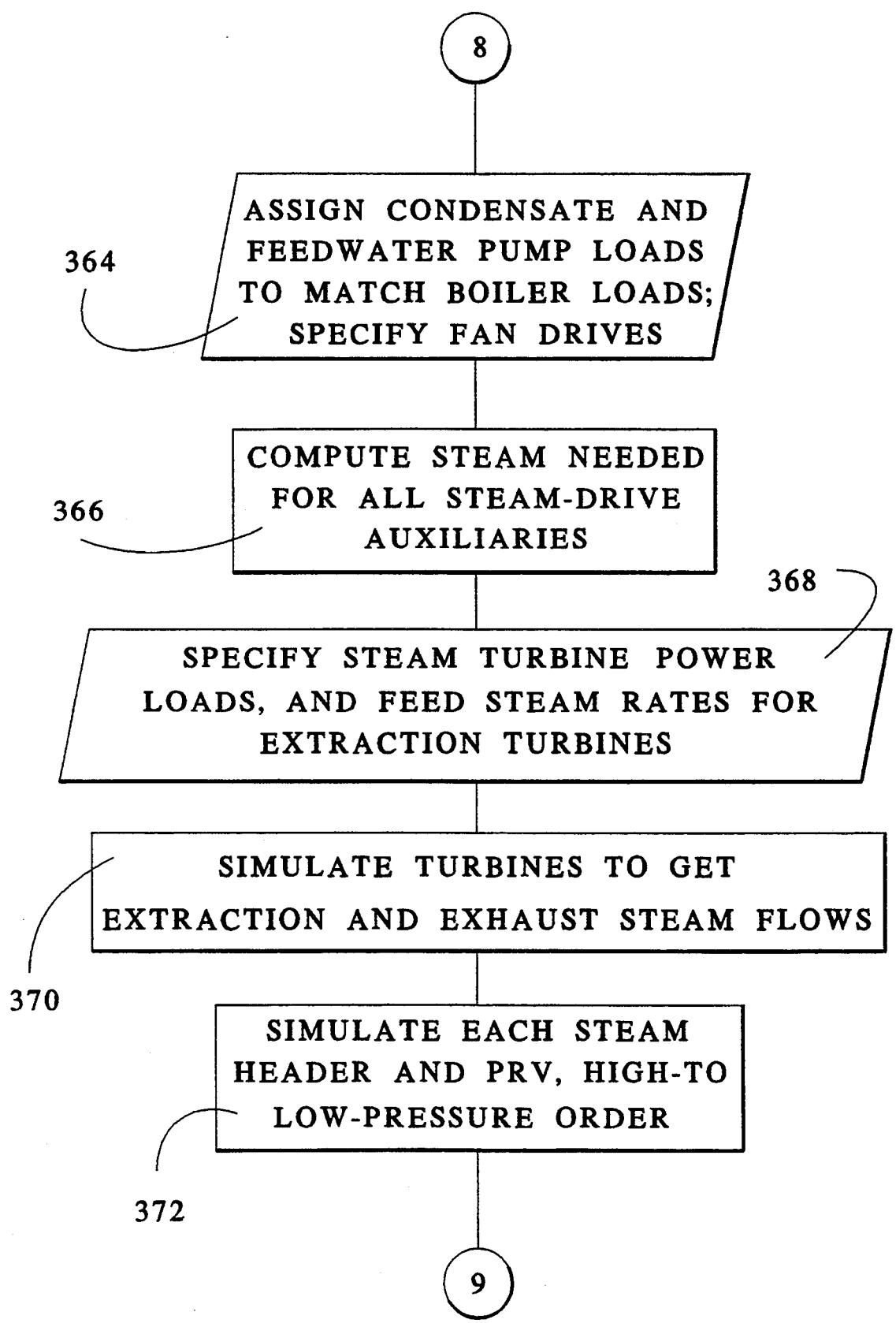
Figure 4D:
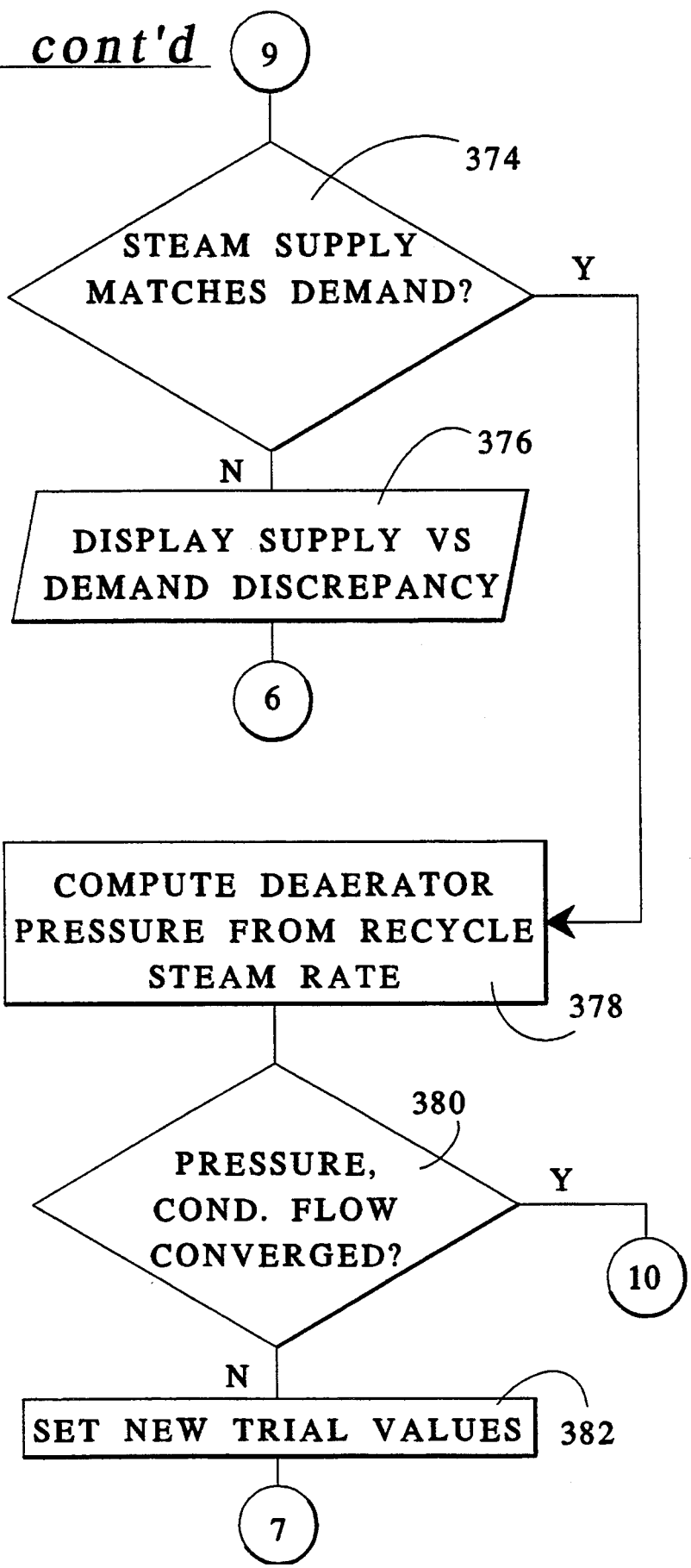

Then unit 358 receives control, which uses the blowdown flows calculated from the steps 352 and 356 for correcting the data which previously had been set to trial values by unit 330. Then unit 360 determines whether the steam supply, calculated from boiler simulations and steps 352 and 356, matches the demand at each required pressure. If not, control passes to unit 362, which causes the monitor 106 to display a discrepancy between supply and demand, after which control returns to unit 354, which prompts the operator to make an adjustment in the steam rates for the non-waste-heat boilers. In this way, additional steam is produced, so that the unit 360 will find that the steam supply matches the demand. If so, control passes to unit 364 (FIG. 4d). Alternatively, the unit 354, instead of requiring an input from the operator, can instead make the necessary adjustment in the steam rate for the non-waste-heat boilers, resulting in satisfying the condition of unit 360. This is readily done by increasing (or decreasing) the steam rate until a match is obtained.

Unit 364 assigns parameters to the condensate and feedwater pump loads, to match the boiler loads simulated in steps 352 and 356. The fan drives are also specified, in order to match the conditions of operation simulated in units 352 and 356. Then unit 366 computes the steam needed for all steam-driven auxiliaries, after which unit 368 prompts the operator to enter parameters corresponding to the steam turbine power loads and the feed steam rates for extraction turbines. In lieu of an operator entry, the steam turbine power loads can be set to the maximum power load obtainable with the calculated steam flows at the 850 psi header. Then the unit 370 simulates operation of the steam turbine in order to get the extraction and exhaust steam flows, after which unit 372 simulates each of the several steam headers, and the various pressure reduction valves illustrated in FIG. 1, in the order from high pressure to low pressure. Then unit 374 determines whether the steam supply matches the demand, and if not, unit 376 displays a supply versus demand discrepancy, and returns control to unit 354. In this way, the steam rate for the non-waste-heat boilers can be increased, so that the supply can be increased to meet the demand as required by unit 374.

Figure 4E:
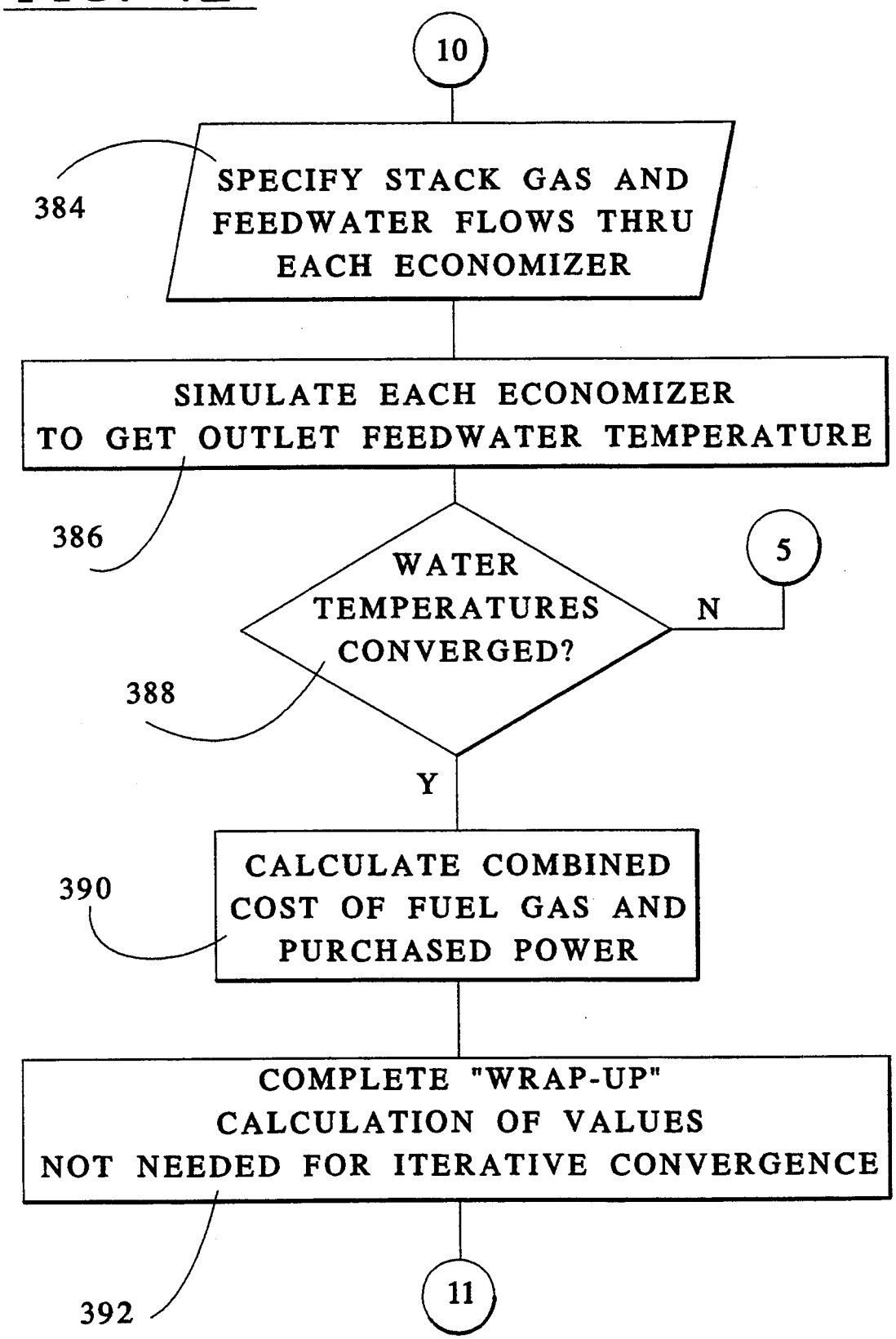
Figure 4E:
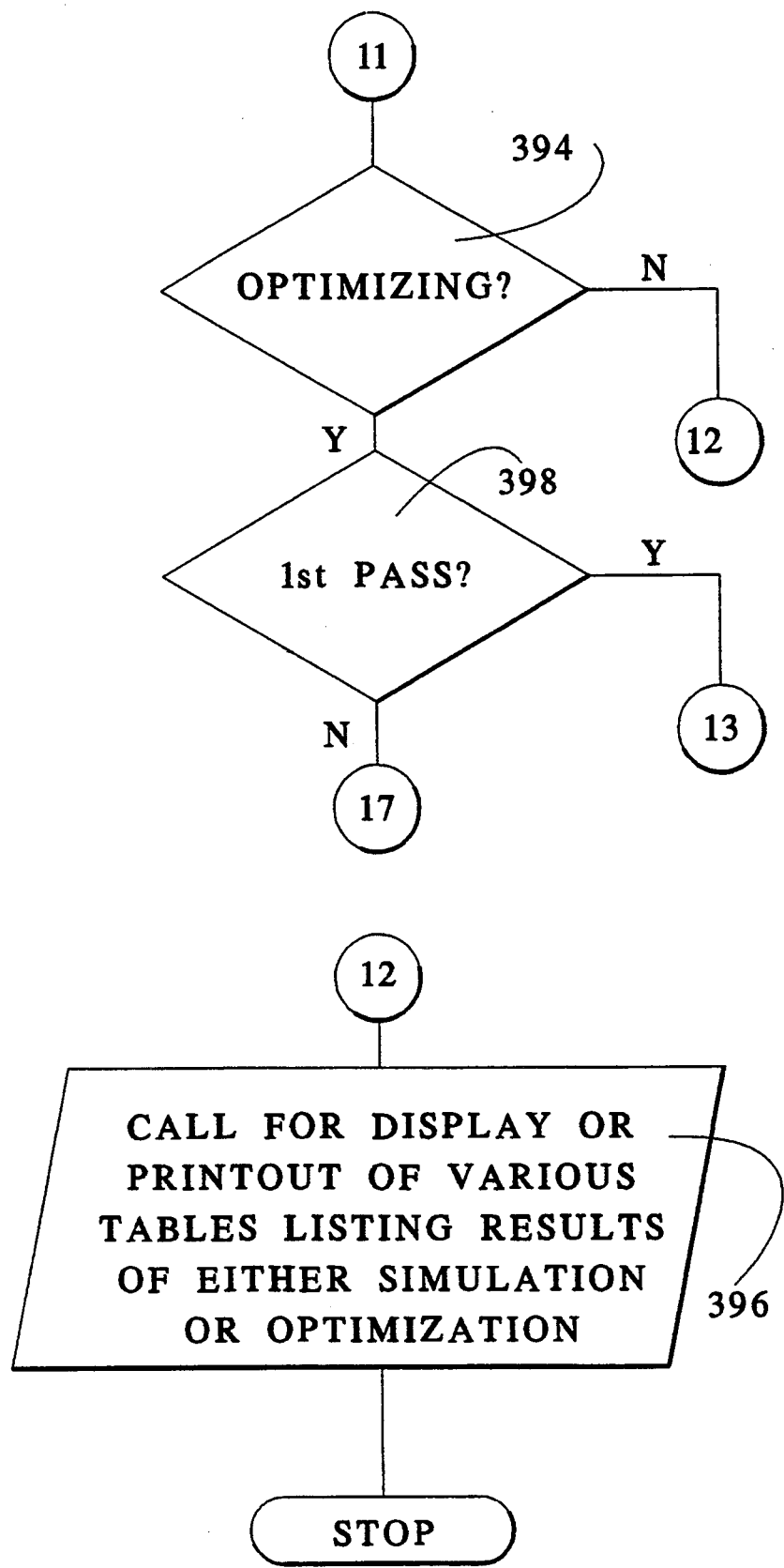
Figure 4F:
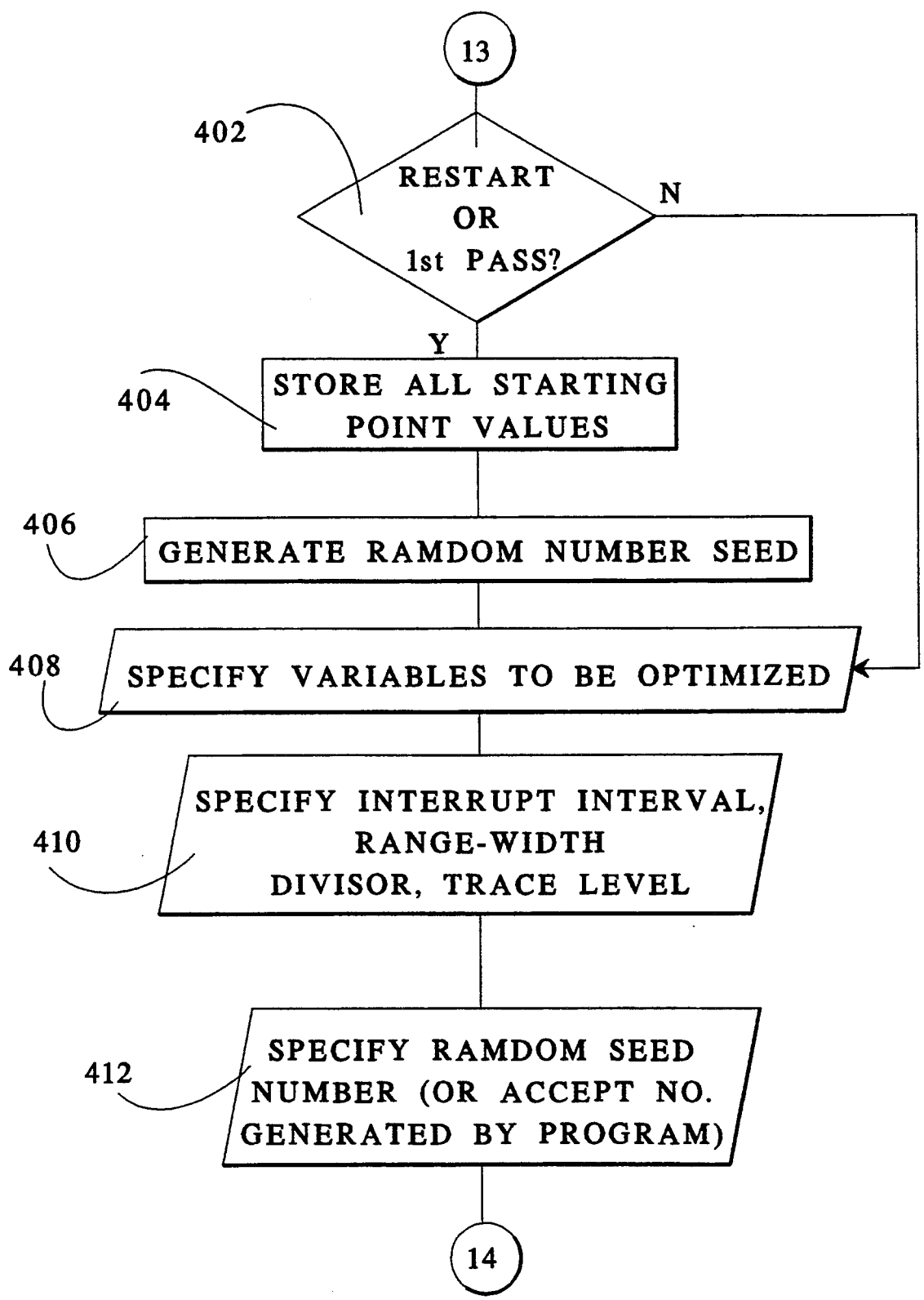
Figure 4F:
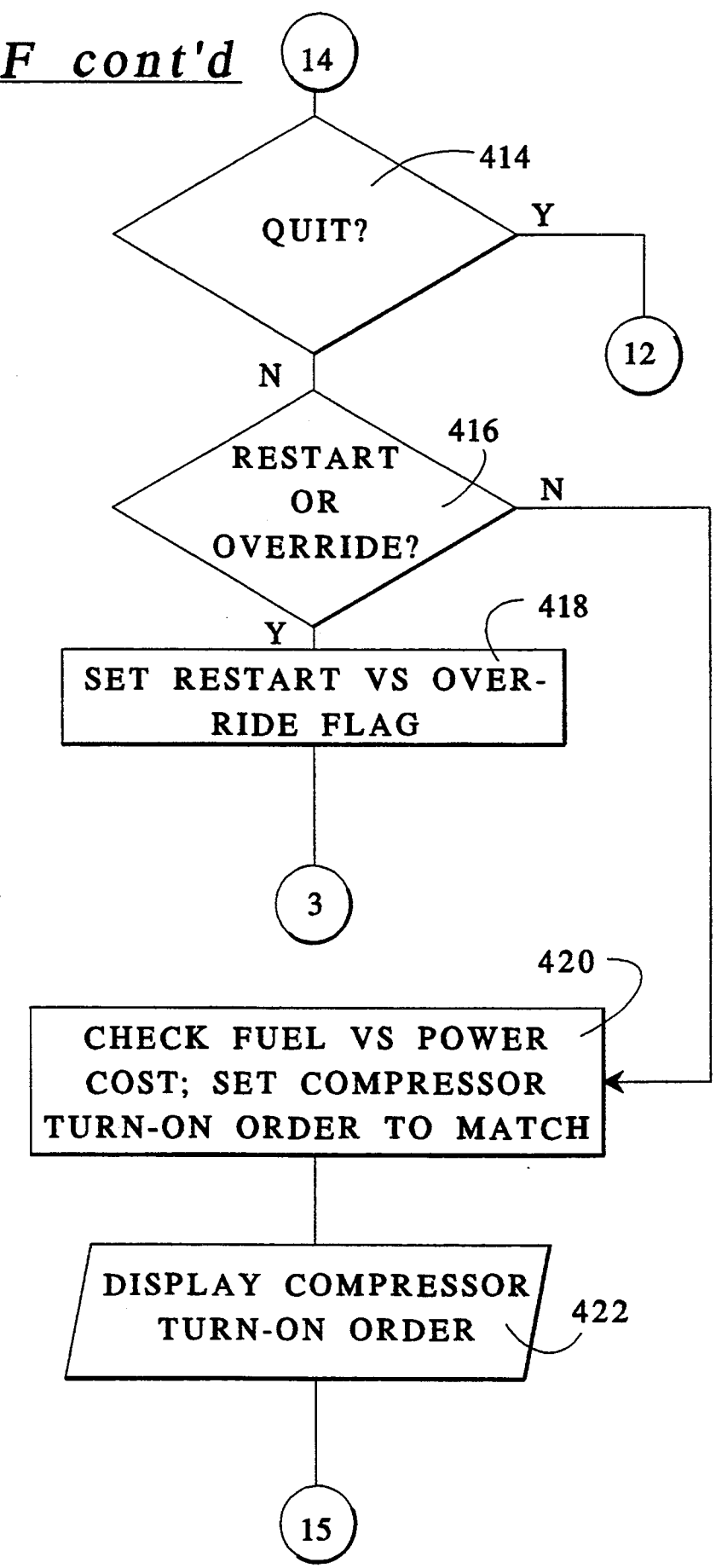

Then unit 378 receives control, which computes the deaerators pressure from the recycled steam rate. Then unit 380 determines whether deaerators pressure computed by unit 378 matches the value set by unit 330. If not, a new trial value is set by unit 382 to a different value, after which control is returned to unit 358. This cycle repeats, until the unit 380 determines that the pressure and condensate flow calculated in 378 complies with the values set by the unit 330 or reset by the unit 382. Then control passes to the unit 384 (FIG. 4e). Unit 384 prompts the operator to enter parameters corresponding to the stack gas flow and the feedwater flow through each economizer. Alternatively, these parameters can be set to previously entered parameters, or to arbitrary values such as an equal flow through each economizer, and an equal amount of stack gas through each economizer. Then unit 386, simulates each economizer to get the outlet feedwater temperature, at which unit 388 determines whether the water temperature corresponds to the trial value set in unit 340. If not, control returns to unit 352, which reiterates the sequence described above, using the outlet feedwater temperature calculated by unit 386. When control returns to unit 388, and the water temperatures are determined to have converged, control passes to unit 390, which calculates the combined cost of the fuel gas for the gas turbines and boilers, and the cost of purchased power not satisfied by the turbine generators or booster turbines. Then control passes to unit 392, which completes the calculation of other values which characterize operation in the system, but which are not needed for iterative convergence. Then control passes to unit 394, which determines whether an optimizing routine has been specified, and if not, control passes to unit 396, which causes the monitor 106 to display the results of the simulation, indicating the operating parameters of the various components with the system, including the cost data calculated in unit 390, and the other values calculated in unit 392. At this point, the simulation of the system specified in accordance with the upgraded entries is complete.

As illustrated by the parts of FIG. 4, simulation of the system proceeds by working backward through the components, beginning with the demands for power and other services by the process plant, and ending with the input conditions. For example, for a given power demand of the process plant, the power load of each turbine generator is set to maximum, or to a random level, or to a previously stored level. If the total power load then exceeds the demand, the load of one or more turbine generators is reduced until a load match is obtained. Simulation of each turbine generator yields the input conditions for that unit. In the case of the turbine generator sets 20 and 22, the connection tables describe that they are supplied by the 850 psi header, so that their required steam flows are summed, along with the demands of the other equipment supplied by the header, to get a total required steam flow through the 850 psi header. The connection tables describe that the 850 psi header is supplied by boiler sets 11 and 13. Thus, the operating levels of the boilers in these sets are set (randomly) within operating limits, so that the total steam supply matches the demand of the 850 psi header. Simulation of the boilers yields their input conditions, such as requirements for hot water supply and supply of heat via fuel or waste gas. In this way, simulation proceeds backwardly throughout the entire powerhouse system.

Figure 4G:
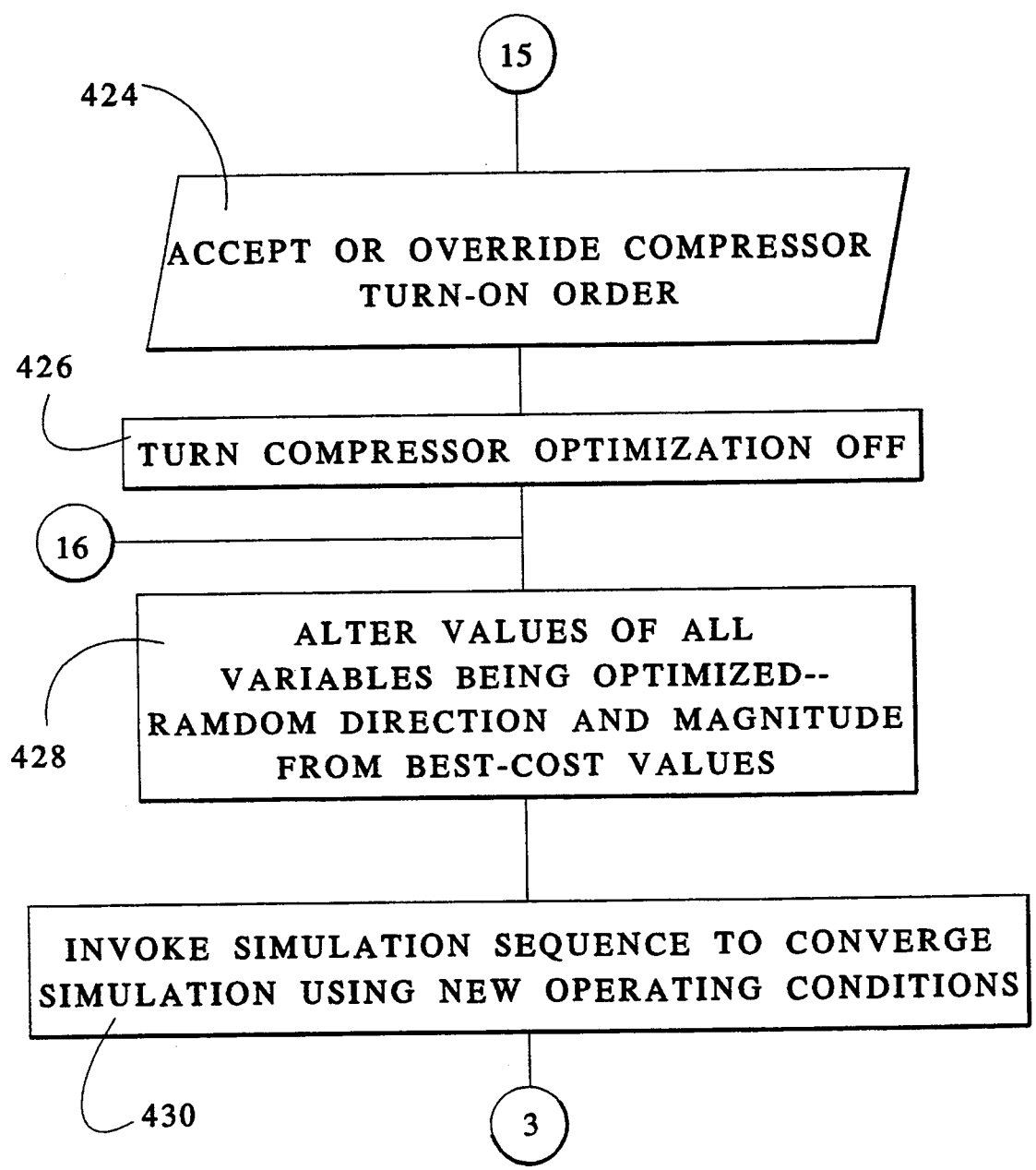
Figure 4G:
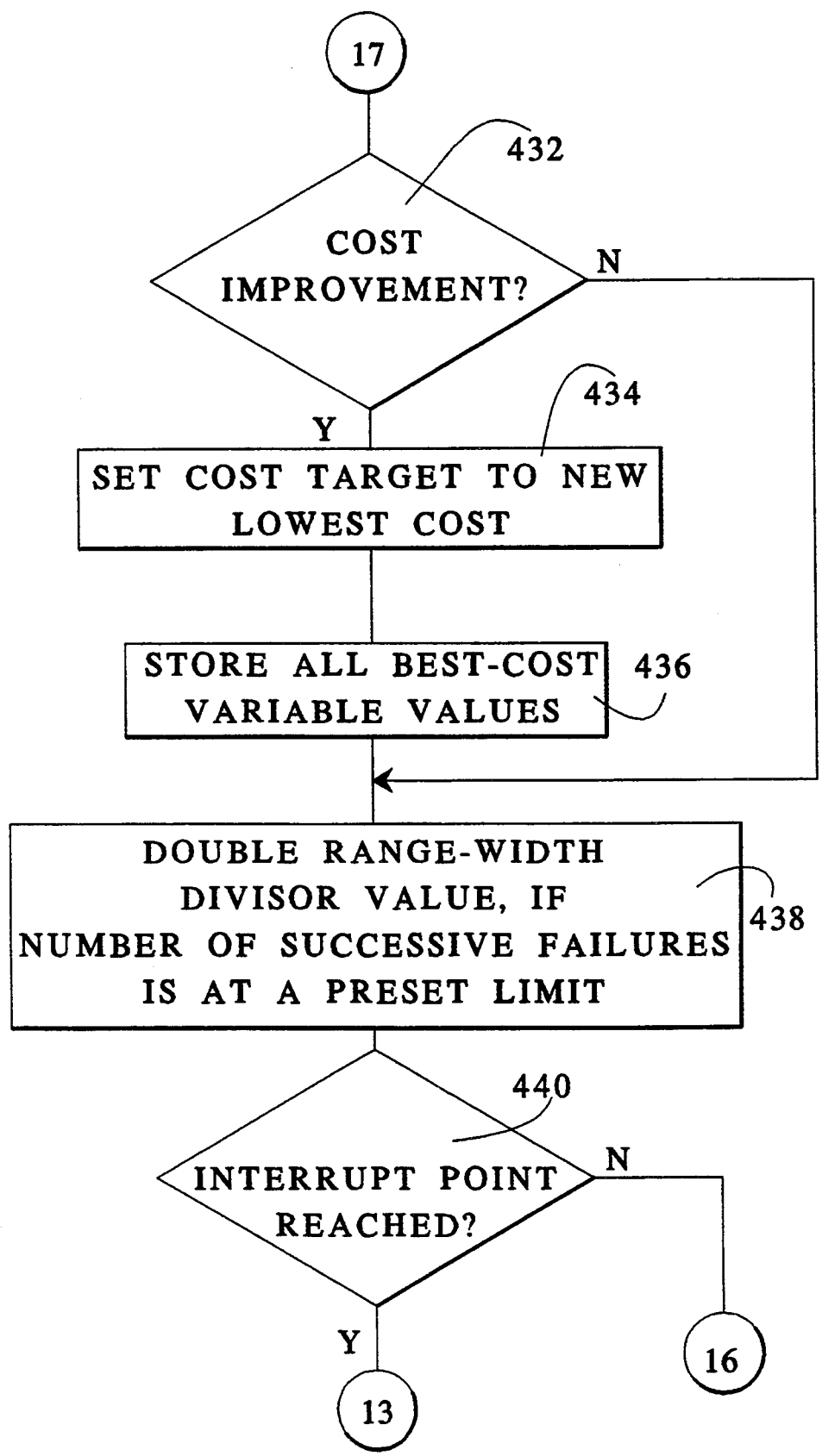

If the unit 394 determines that an optimizing routine has been called for, then control passes to unit 398, which determines whether it is a first pass through the optimizing routine. If so, control passes to unit 402 (FIG. 4f), otherwise control passes to unit 432 (FIG. 4g).

When unit 402 receives control, for the first time, it passes control to unit 404. Otherwise, control passes directly to unit 408, unit 404 stores all of the starting point values calculated in the steps up through 392, and then unit 406 generates a random number seed. The use of a random number allows the parameters which are varied during the optimization to be varied by a random quantity, either at an increasing or decreasing direction, and then unit 408 prompts the operator to specify the variables to be optimized.

The variables which may be optimized are loadings for the air compressors, gas turbines, and steam turbines, and economizers, the throttle steam rate for extraction steam turbines, the gas turbine exhaust gas flow and boiler stack flow distribution, and the feedwater flow through medium pressure pumps. For each of these parameters, the user may elect to "freeze" current values and cancel further optimization of that group, any time the unit 408 receives control.

In addition to specifying the various groups to be optimized, the operator may specify the number of iterations to be performed, before interruption to permit user intervention, if desired. In this event, unit 408 does not prompt for variables, but instead passes control directly to unit 410, for the number of specified iterations. Also, as described in more detail hereinafter, the operator may enter an initial value for a range-width divisor applicable to all randomized provocations, and a "trace level" which determines the extent of which intermediate values are displayed on the monitor 106. The operator may also enter a specific random seed, while unit 408 has control, in place of the random number seed generated by unit 406.

Unit 410 prompts the operator for entry of interrupt interval, range-width divisor, and trace level. Then unit 412 prompts the operator to enter a random seed number or to accept the seed generated by unit 406.

When a number of iterations has been specified, control passes directly through units 410, 412 and 414 without pausing to prompt the operator, for the number of specified iterations. Then unit 414 determines whether the number of iterations has been completed, and if so, passes control to unit 396 (FIG. 4E), which displays the result of the optimization, and halts operation. Otherwise, control is passed to unit 416, which determines whether a restart operation is desired. If so, control passes to unit 418, which sets a restart flag, and returns control to unit 330, so that a simulation run can be restarted from that point. Otherwise, control passes to unit 420, which sets the compressor turn-on order to match the comparison between fuel cost and power cost. Then unit 422 displays the compressor turn-on order, and passes control to unit 424 (FIG. 4g) which prompts the operator to accept or override the compressor turn-on order. This allows the specification of air compressors which are driven by either electric power steam power, or natural gas power, in accordance with the relative cost of these power sources.

Unit 426 then turns the compressor optimization off so that subsequent steps do not alter the order in which the compressors are turned-on as needed. Then control passes to unit 428, which alters values of all variables in a random direction and magnitude. The starting point for the alteration is the best cost basis which has heretofore been determined during the initial simulation or a previous optimization run. Then unit 430 invokes a simulation sequence (unit 330–392) which completes the simulation of the system, using the new operating conditions, altered by means of unit 428. Then unit 432 determines whether this is a cost improvement, compared with the previous best cost conditions, and if so, unit 434 stores the new cost as the lowest calculated cost, after which unit 336 stores all of the parameters which lead to the best cost result. Then control is passed to unit 438.

If unit 432 does not determine that a cost improvement has been found, control passes directly to unit 438.

When unit 438 receives control, the range-width divisor is doubled, thus reducing the range, provided that the number of iterations up to a given limit has failed to find a cost improvement. Then unit 440 receives control, which determines whether an interrupt point has been reached, either by a break command entered by the operator via the keyboard 104, or the completion of a predetermined number of iterations. If not, control returns to unit 428, so that variables are again randomized, and the procedure is repeated through unit 440. When the prescribed number of iterations has been completed, control returns to unit 402, as described above.

In this way, optimization takes place by randomly modifying the appropriate parameters, and executing the simulation routines, repetitively, until a cost improvement is recognized. If no cost improvement has been found, in each iteration, the parameters are altered again, and the process is repeated repetitively for a predetermined number of iterations. During the iterations, if a more effective cost figure is not arrived at, the range of random variations is decreased, so that finer and finer random adjustments are made in the various parameters, with the result that a combination of parameters is selected, with greater and greater accuracy in the parameters, which yields the lowest cost result.

The entire optimization routine can be rerun multiple times, each time using a new random seed or a different specified seed, to ensure that optimization proceeds from a different starting point. In this way, a global optimization is assured, instead of the possibility that only local optimization is realized.

The random variation of parameters is carried out, using an adaptive random search procedure, which adjusts the range of the random variations which are made in the various parameters, from time to time, and which also accounts for minimum and maximum limits for the parameters, and for a probability of turn off for each parameter. For any actual parameter Va, which is to be varied randomly, a normalized value Vn between a minimum limit Vmin and a maximum limit Vmax is established by:

$$Vn = Po + (1-Po)*(Va-Vmin)/(Vmax=Vmin)$$

where Po is the probability of turn off of the parameter.

A range divisor R is provided for controlling the range of random variation. At the start of the optimization routine, R is set to a small value, which provides for a wide variation in the adjustment of the parameters such as Va which are randomized. As optimization proceeds, the range divisor R is increased, so as to make the random variations smaller and smaller, so that an optimum operating condition can be identified with precision.

A random number N is generated by a conventional random number generator, using a "seed" which may either be input by the operator, or derived from a parameter such as the current time of day, or the like. N is constrained to be between −1 and +1. Then N is adjusted by the range divisor, to yield an adjusted variation of N/R, which varies between −1/R and +1/R. The normalized parameter Vn is then adjusted up or down by adding N/R:

$$Vn' = Vn + N/R$$

Then Vn' is compared with the normalized limits of +1 (for maximum) and Po (for minimum). If Vn' > +1 then Vn' is set equal to 1. If Vn' < Po then Vn' is turned off, i.e., the unit with which the parameter Va is associated is treated as being turned off or taken out of service, for the purpose of the optimization. If Vn' is equal or greater than Po, then the actual parameter Va is established, between the minimum and maximum limits according to:

$$Va = Vmin + (Vn'-Po)*(Vmax-Vmin)/(1-Po)$$

which follows from the equation given above for Vn. It can be seen that the value Po sets a probability of turn off of the parameter. For example, if Po=0.1, then there is a 10% probability that the unit with which Va is associated will be turned off, when Vn is allowed to vary between 0 and +1. The variation is each time from the previous value of Vn associated with the best case previously found, so that for values of Vn close to Po, the probability of turn off of the associated unit is increased.

The range divisor R is doubled periodically, when a better solution is not found within a predetermined number of iterations, so that the variation N/R becomes smaller and smaller, allowing convergence on a best case for the operating cost. When the range divisor reaches a high level, representing very small variations, a local optimum solution is found. To insure finding the global optimum, the optimization routine is restarted, so that the range divisor is restored to maximum, and the operation repeated, with the result that a different local optimum may be found. If such is better than the best case previously found, the parameters associated with the new local optimum are stored, and may be displayed on the monitor or printed out on the printer. By repeating the restarts for a large number of times, the finding of a global optimum solution is assured. Confidence that a global optimum has been found increases with the number of restarts.

The operator may select the number of restarts to be performed in sequence, so that restarts are initiated automatically after each convergence on a local optimum. From the foregoing, it will be appreciated that the present invention offers a simple and effective apparatus and method for simulating and optimizing a powerhouse made up of multiple components having interrelated effects. The invention may be used on an existing powerhouse construction, in order to fine tune its operation for maximum cost efficiency, or can be used to described the economic effect of operating a hypothetical powerhouse with defined components at defined demand levels.

Although multiple repetitions are involved, both in simulation and optimization routines, the routines converge quickly, so that the invention may be used to control an actual powerhouse in response to rapidly changing conditions, such as different power requirements for the powerhouse. In this way, if there is a perceived change in the demand for electrical power, or the demand for steam at a particular pressure, operation of the powerhouse can be altered to preserve maximum economy of operation irrespective of the changed conditions.

The parameters which are randomly varied affect all of the components of the powerhouse system, and constitute, for the arrangement illustrated in FIG. 1:

a) the power level for each of the steam turbine generators;
b) the throttle steam for each of the steam turbine generators;
c) the loads for each of the boilers;
d) the water flow for each of the economizers;
e) the flows for boiler feedwater pumps; and
f) the allocations of the flow of exhaust gases.

Equipment which may selectively be designated by the operator as having fixed (invariable operating characteristics) are:

a) air compressors;
b) boilers;
c) economizers;
d) gas flow allocations;
e) gas turbine generators;
f) boiler feedwater pump throughputs;
g) steam turbine generator power level; and
h) steam turbine generator throttle steam. Although the present invention has been described particularly in connection with the system shown in FIG. 1, it will be appreciated that the method and apparatus of the invention may simulate or optimize systems having more or fewer components, such as gas turbine generators, steam turbine generators, boilers and the like, assembled in various configurations. The assemblage may include and simulate equipment that does not currently exist.

It will be apparent that various modifications and/or additions may be made in the apparatus and method of the present invention, without departing from the essential features of novelty thereof, which are intended to be defined and secured by the appended claims.

What is claimed is:

1. A method for simulating operation of a powerhouse and optimizing the operating characteristics thereof, said powerhouse including at least one steam turbine driven electric generator and at least one boiler for generating steam for said turbine, in which predetermined constants include the electrical power demand required by a process plant powered by said powerhouse, the cost of purchased electric power required to satisfy said demand which cannot be supplied by said powerhouse, and the cost of fuel required to operate said boiler, said method comprising the steps of defining the operating characteristics of said generator which represent a generator output power which satisfies said demand or which represent the maximum capacity of said generator, said defined generator operating characteristics including the required steam flow from said boiler to operate said generator, defining the operating characteristics of said boiler which produce said required steam flow, said defined boiler operating characteristics including the amount of fuel per unit time to operate said boiler, calculating the operating cost for the power plant consisting of the cost of the fuel per unit time plus the cost of said purchased power per unit time, randomly varying a plurality of the operating characteristics of said generator and said boiler by simulation, calculating said operating cost associated with said simulated randomly varied operating characteristics, and iteratively repeating said simulated random varying of operating characteristics and calculation of operating costs until an optimized lower total operating cost is arrive at, and manifesting the operating characteristics associated with said lower operating cost.

2. The method according to claim 1, including the step of adjusting said generator and said boiler in accordance with the operating characteristics associated with said lower operating cost, whereby said power plant can be operated at maximum cost effectiveness.

3. The method of claim 1, including the step of assigning fixed values to some of said operating characteristics, whereby only the other operating characteristics are randomly varied by simulation to derive said lower operating cost.

4. The method according to claim 1, including the step of generating a sequence of random numbers, using said random numbers to adaptively vary each of said operating characteristics within a limited range of values around an initial value for each of said operating characteristics, decreasing said range if a said lower operating cost is not found within a predetermined number of repetitions of said varying and calculating steps.

5. The method according to claim 4, including the step of adding an adjustable variation to each of a plurality of normalized parameters related to said operating characteristics, during each said repetition, said adjustable variation comprising R/N, where R is a random number in the range of −1 to +1, and N is an arbitrary divisor defining said range.

6. The method according to claim 5, including the steps of obtaining a normalized value Vn for each of said parameters Va according to:

$$Vn = Po + (1-Po)*(Va-Vmin)/(Vmax-Vmin)$$

where Vmin and Vmax are minimum and maximum limits for said normalized parameter, and Po is a probability figure; limiting the value of Vn plus said adjustable variation to a predetermined maximum value, and turning off the component with which said parameter is associated, when the value of Vn plus said adjustable variation is less than Po.

7. The method according to claim 1, wherein said powerhouse includes at least one additional component from the group of components containing one or more additional boilers, one or more additional steam turbine generators, one or more economizers, one or more pressure reducing valves, one or more flash tanks, one or more deaerators, one or more gas turbine generators, one or more booster turbine generators, new or more auxiliary turbine generators powered by electricity, natural gas or steam, one or more condensate heaters, one or more desuperheaters, and one or more air compressors, and including the steps of simulating interconnected ones of said components in the order beginning with the demands of a process plant powered by said powerhouse for electrical energy.

8. Apparatus for simulating and optimizing a powerplant having at least a steam turbine generator and a boiler for generating steam for said steam turbine generator, comprising, in combination;

first means representing an algorithm which relates a plurality of independent and dependent variables describing operation of said steam turbine generator, second means representing an algorithm which relates the independent and dependent variables describing operation of said boiler, memory means for storing data representative of the cost of fuel for said boiler, the power demand for a process plant powered by said powerhouse, and the cost of purchased power needed to satisfy any portion of said power demand which cannot be satisfied by said steam turbine generator, means for supplying to said first means from said memory means said data representative of said power demand, whereby said first means develops data representative of the steam requirements of said steam turbine generator in response thereto, means for supplying said steam-representative data to said second means from said first means, whereby said second means develops data representative of the fuel requirements of said boiler, third means receiving said fuel-representative data and calculating the operating cost of said powerhouse in response thereto, and for calculating the cost of purchased power required to satisfy said power demand which cannot be satisfied by said steam turbine generator, means for periodically randomly modifying the power level output of said steam turbine generator by simulation and iteratively repeating operation of said first, second and third means to calculate new values for the operating cost of said powerhouse at the modified power level, and means for storing the power level of said steam turbine generator corresponding to an optimized lower combined operating cost of said powerhouse plus the said cost of purchased power.

* * * * *